(12) United States Patent
Keenan

(10) Patent No.: US 12,091,134 B2
(45) Date of Patent: *Sep. 17, 2024

(54) SYSTEM AND METHOD FOR BICYCLE TRANSMISSION

(71) Applicant: Joseph Francis Keenan, Superior, CO (US)

(72) Inventor: Joseph Francis Keenan, Superior, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,507

(22) Filed: Jul. 5, 2023

(65) Prior Publication Data

US 2023/0339572 A1    Oct. 26, 2023

Related U.S. Application Data

(63) Continuation of application No. 18/110,673, filed on Feb. 16, 2023, now Pat. No. 11,772,743.

(60) Provisional application No. 63/311,722, filed on Feb. 18, 2022.

(51) Int. Cl.
  *B62M 9/121* (2010.01)
  *B62M 11/04* (2006.01)
(52) U.S. Cl.
  CPC ............ *B62M 9/121* (2013.01); *B62M 11/04* (2013.01)
(58) Field of Classification Search
  CPC ......... F16H 15/42; B62M 9/04; B62M 11/04; Y10T 74/19344
  USPC ............................................. 474/139, 83, 78
  See application file for complete search history.

(56) References Cited

U.S. PATENT DOCUMENTS

| | | | | |
|---|---|---|---|---|
| 299,231 A | * | 5/1884 | Laird | ...................... F16H 15/42 476/52 |
| 374,296 A | * | 12/1887 | Evans | ...................... F16H 15/42 476/52 |
| 390,216 A | * | 10/1888 | Evans | ...................... F16D 43/10 476/52 |

(Continued)

FOREIGN PATENT DOCUMENTS

| | | |
|---|---|---|
| EP | 2986492 | 3/2014 |
| WO | WO 2007/034154 | 3/2007 |

OTHER PUBLICATIONS

PCT International Search Report for International Application PCT/US2023/013292, search report data of mailing Jun. 16, 2023 (Jun. 16, 2023).

*Primary Examiner* — Henry Y Liu
(74) *Attorney, Agent, or Firm* — Daniel W. Roberts; Law Offices of Daniel W. Roberts, LLC

(57) ABSTRACT

A system and method for a bicycle transmission. Specifically, a bicycle transmission having a housing with a first shaft passing therethrough and a set of two cones in opposing parallel alignment disposed within the housing. The first cone engaged about the first shaft, the second cone engaged about a second shaft parallel to the first shaft, the second shaft structured and arranged to have at least a proximal position and a distal position relative to the first shaft. A driver is disposed generally normally about one of the two cones and passing therebetween, the driver structured and arranged to engaging a portion of the first cone with a portion of the second cone when the second cone is in the proximal position. A driver mover structured and arranged to move the driver between the cones when the second cone is in the distal position; and a transfer element joined to an end of the second shaft.

36 Claims, 17 Drawing Sheets

(56) References Cited

U.S. PATENT DOCUMENTS

| | | | | |
|---|---|---|---|---|
| 625,835 A * | 5/1899 | Davis | F16H 3/363 | 280/281.1 |
| 627,491 A * | 6/1899 | Evans | F16H 15/42 | 476/52 |
| 655,749 A * | 8/1900 | Allyne et al. | F16H 15/42 | 476/52 |
| 691,789 A * | 1/1902 | Mann | F16H 9/26 | 475/182 |
| 742,977 A * | 11/1903 | Evans | F16H 15/42 | 476/52 |
| 760,460 A * | 5/1904 | Leighton | F16H 15/42 | 476/52 |
| 955,920 A * | 4/1910 | Stevens | F16H 9/04 | 474/81 |
| 1,048,220 A * | 12/1912 | Sleeper | F16H 3/02 | 474/83 |
| 1,080,609 A * | 12/1913 | Vieson | F16H 15/42 | 476/52 |
| 1,637,664 A * | 8/1927 | Stoeckicht | F16H 15/42 | 476/53 |
| 1,709,346 A * | 4/1929 | Garrard | F16H 15/42 | 476/53 |
| 1,868,676 A * | 7/1932 | Stoeckicht | F16H 15/42 | 476/48 |
| 2,072,646 A * | 3/1937 | Ocenasek | B23Q 5/04 | 408/128 |
| 2,078,859 A * | 4/1937 | Lapham | B23Q 5/04 | 474/78 |
| 2,205,031 A * | 6/1940 | Bugden | F16H 15/42 | 476/48 |
| 2,233,967 A * | 3/1941 | Wellton | F16H 37/0853 | 476/53 |
| 2,304,779 A * | 12/1942 | Curtis | B23C 9/00 | 409/211 |
| 2,392,035 A * | 1/1946 | Fett | B23Q 1/5481 | 409/204 |
| 2,432,442 A * | 12/1947 | Pourtier | F16H 15/42 | 476/53 |
| 2,583,790 A * | 1/1952 | Mikina | F16H 15/20 | 476/51 |
| 2,764,029 A * | 9/1956 | Pernollet | F16H 15/42 | 476/53 |
| 2,865,213 A * | 12/1958 | Pernollet | F16H 15/42 | 476/53 |
| 2,869,378 A * | 1/1959 | Fischer | F16H 55/10 | 74/216.3 |
| 3,013,473 A * | 12/1961 | Straus | B23C 1/12 | 409/184 |
| 3,043,149 A * | 7/1962 | Davin | F16H 15/42 | 476/53 |
| 3,083,582 A * | 4/1963 | Wheeler | F16H 7/023 | 474/205 |
| 3,165,002 A * | 1/1965 | Hatch | F16H 9/24 | 474/77 |
| 3,257,857 A * | 6/1966 | Davin | F16H 15/42 | 476/53 |
| 3,873,128 A * | 3/1975 | Dunder | B62M 11/12 | 280/236 |
| 3,894,439 A * | 7/1975 | Borello | F16H 9/08 | 474/131 |
| 3,906,809 A * | 9/1975 | Erickson | F16H 9/24 | 474/83 |
| 4,009,950 A * | 3/1977 | Suzaki | G03B 21/48 | 474/81 |
| 4,229,985 A * | 10/1980 | Borello | F16H 15/42 | 476/53 |
| 4,481,005 A * | 11/1984 | Mann, Jr. | F16H 7/023 | 474/139 |
| 4,687,391 A * | 8/1987 | Pretty | B23Q 37/002 | 409/230 |
| 4,842,569 A * | 6/1989 | Orr | B62M 9/04 | 474/140 |
| 5,069,078 A * | 12/1991 | Fairbanks | F16H 3/423 | 74/216.3 |
| 5,404,768 A * | 4/1995 | Hwang | F16H 3/083 | 74/369 |
| 5,553,510 A * | 9/1996 | Balhorn | B62M 11/16 | 74/354 |
| 5,611,556 A * | 3/1997 | Davidow | B62M 9/04 | 280/238 |
| 5,924,953 A * | 7/1999 | Rohs | F16H 15/42 | 476/52 |
| 5,979,924 A * | 11/1999 | D'Aluisio | B62M 9/04 | 280/259 |
| 6,089,114 A * | 7/2000 | Kang | B62M 11/06 | 74/331 |
| 6,139,465 A * | 10/2000 | Holliday | F16H 15/54 | 476/55 |
| 6,277,048 B1 * | 8/2001 | Rohs | F16H 15/42 | 476/55 |
| 6,343,521 B1 * | 2/2002 | Brannon | F16H 3/423 | 74/349 |
| 6,908,406 B2 * | 6/2005 | Overbay | F16H 15/42 | 474/54 |
| 7,048,667 B2 * | 5/2006 | DeVincent | F16H 37/0853 | 475/214 |
| 7,232,396 B2 * | 6/2007 | Reisch | F16H 15/42 | 475/214 |
| 7,258,637 B2 * | 8/2007 | Thomasberg | B62M 9/14 | 474/160 |
| 7,326,137 B2 * | 2/2008 | van der Linde | B62M 9/04 | 474/80 |
| 7,361,109 B2 * | 4/2008 | Kilshaw | B62M 9/04 | 474/81 |
| 7,559,868 B2 * | 7/2009 | Rohs | F16H 37/021 | 475/211 |
| 7,574,935 B2 * | 8/2009 | Rohs | F16H 37/022 | 476/52 |
| 7,585,240 B2 * | 9/2009 | Kamada | B62M 9/10 | 474/148 |
| 7,597,638 B2 * | 10/2009 | Cooke | B62M 11/04 | 474/84 |
| 7,803,007 B1 | 9/2010 | Spaude | | |
| 7,803,077 B1 * | 9/2010 | Spaude | F16H 9/08 | 474/83 |
| 8,066,596 B1 * | 11/2011 | Kilshaw | B62M 9/12 | 474/81 |
| 8,187,142 B2 * | 5/2012 | Rohs | F16H 15/42 | 476/51 |
| 8,475,306 B2 * | 7/2013 | Vrielink | B62M 9/12 | 474/81 |
| 8,944,945 B2 * | 2/2015 | Kilshaw | B62J 13/00 | 474/78 |
| 9,555,854 B2 * | 1/2017 | Bendel | B62M 6/55 | |
| 9,623,931 B2 * | 4/2017 | Emura | B62M 9/132 | |
| 9,789,928 B2 * | 10/2017 | Emura | B62M 9/12 | |
| 9,873,287 B2 * | 1/2018 | Emura | B62M 9/10 | |
| 10,006,525 B2 * | 6/2018 | Xu | F16H 9/24 | |
| 10,300,986 B2 * | 5/2019 | Emura | B62M 9/134 | |
| 2002/0142883 A1 * | 10/2002 | Pavlov | F16H 15/42 | 476/51 |
| 2003/0221892 A1 * | 12/2003 | Matsumoto | B62M 9/04 | 180/230 |
| 2004/0014543 A1 * | 1/2004 | Van Der Linde | B62M 11/06 | 474/160 |
| 2004/0066017 A1 * | 4/2004 | Dratewski | B62M 11/06 | 280/260 |
| 2004/0067804 A1 * | 4/2004 | Dratewski | B62M 11/04 | 474/81 |
| 2004/0130120 A1 * | 7/2004 | Matsumoto | B62J 13/04 | 280/260 |
| 2004/0176199 A1 * | 9/2004 | Overbay | F16H 15/42 | 474/83 |
| 2005/0160850 A1 * | 7/2005 | Reisch | F16H 15/42 | 74/340 |
| 2005/0164825 A1 * | 7/2005 | Reisch | F16H 15/42 | 476/52 |

(56) References Cited

U.S. PATENT DOCUMENTS

| | | | |
|---|---|---|---|
| 2005/0215391 A1* | 9/2005 | Reisch | F16H 15/42 476/22 |
| 2006/0058131 A1* | 3/2006 | Cooke | B62M 9/04 474/78 |
| 2006/0194667 A1* | 8/2006 | Rohs | F16H 61/6649 476/61 |
| 2006/0217227 A1* | 9/2006 | Rohs | F16H 15/42 476/52 |
| 2006/0240919 A1* | 10/2006 | Matsumoto | B62M 11/145 474/78 |
| 2006/0252589 A1* | 11/2006 | Tay | F16H 63/067 474/49 |
| 2006/0270517 A1* | 11/2006 | Rohs | F16H 37/086 475/312 |
| 2007/0004556 A1* | 1/2007 | Rohs | F16H 37/086 477/130 |
| 2007/0137341 A1* | 6/2007 | Harrelson | F16H 15/20 74/349 |
| 2008/0261735 A1* | 10/2008 | Cappellini | B62M 9/04 474/78 |
| 2009/0118073 A1* | 5/2009 | Rohs | F16H 15/42 476/61 |
| 2009/0247352 A1* | 10/2009 | Kamiya | F16H 15/42 476/52 |
| 2009/0305841 A1* | 12/2009 | Rohs | F16H 55/34 476/52 |
| 2010/0016117 A1* | 1/2010 | Rohs | C10M 101/02 476/52 |
| 2010/0113211 A1* | 5/2010 | Schneider | B60L 15/2054 476/31 |
| 2010/0167868 A1* | 7/2010 | Kamiya | F16H 61/6649 476/48 |
| 2011/0070995 A1* | 3/2011 | Yamashita | F16H 15/42 903/909 |
| 2011/0070996 A1* | 3/2011 | Yamashita | B60K 6/543 476/52 |
| 2011/0165988 A1* | 7/2011 | Hoffman | F16H 37/0853 475/214 |
| 2011/0230289 A1* | 9/2011 | Schuseil | F16G 13/04 474/206 |
| 2011/0256971 A1* | 10/2011 | Kilshaw | B62M 9/04 474/134 |
| 2011/0263378 A1* | 10/2011 | Rohs | F16H 37/021 476/53 |
| 2013/0143713 A1* | 6/2013 | Rohs | F16H 15/42 476/1 |
| 2013/0150200 A1* | 6/2013 | Schmitz | B62M 11/04 475/207 |
| 2016/0069436 A1* | 3/2016 | Rohs | F16H 61/12 476/52 |
| 2016/0090151 A1* | 3/2016 | Bendel | B62M 6/50 180/206.3 |
| 2016/0167733 A1* | 6/2016 | Kawakami | B62M 6/70 180/220 |
| 2016/0257375 A1* | 9/2016 | Emura | B62M 9/04 |
| 2016/0272276 A1* | 9/2016 | Ferreira Marinho | B62M 5/00 |
| 2017/0313385 A1* | 11/2017 | Emura | B62K 25/286 |
| 2017/0355578 A1* | 12/2017 | Hall | F16G 13/04 |
| 2017/0370466 A1* | 12/2017 | Rohs | F16H 57/0491 |

* cited by examiner

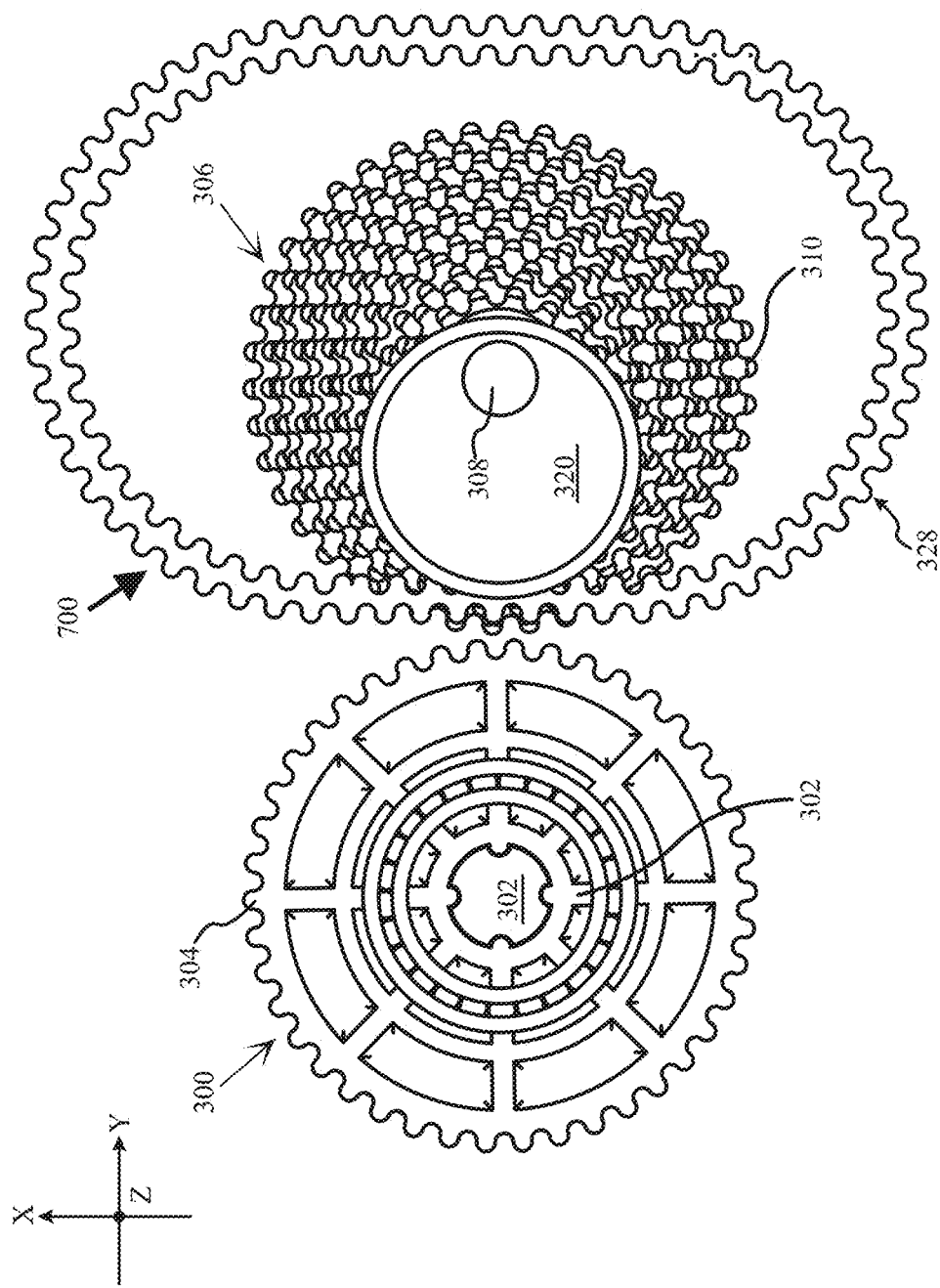

SYSTEM AND METHOD FOR BICYCLE TRANSMISSION

CROSS REFERENCE TO RELATED APPLICATIONS

This application is a Continuation of U.S. patent application Ser. No. 18/110,673 filed Feb. 16, 2023 and entitled SYSTEM AND METHOD FOR BICYCLE TRANSMISSION, now U.S. Pat. No. 11,772,743 and incorporated herein by reference, U.S. application Ser. No. 18/110,673 having claimed the benefit under 34 U.S.C. § 119(e) of U.S. Provisional Application No. 63/311,722 filed Feb. 18, 2022 and entitled SYSTEM AND METHOD FOR BICYCLE TRANSMISSION, the disclosure of which is incorporated herein by reference. This continuing application claims the benefit of U.S. Provisional Application No. 63/311,722 filed Feb. 18, 2022.

FIELD OF THE INVENTION

The present invention relates generally to a bicycle transmission system that can securely house the majority of the transmission shifting system of a bicycle at the bottom bracket location, without losing any power transmission efficiency. This provides a much more robust transmission system compared to the state of the art, as the system is protected from damage and debris as a result of bicycle riding, especially in off-road riding. This significantly reduces maintenance time and cost. Furthermore, the present invention provides an industry leading torque ratio range, and other benefits such as shifting under load and in static condition.

BACKGROUND

The use of mechanisms to allow a cyclist to change the torque ratio on their bicycle—e.g. a bicycle transmission—has been employed for many years. The most popular system, which employs a derailleur system that shifts the chain up and down consecutively sized spur gears, has been around for over one hundred years. This base design has been consistently improved over the years to optimize weight and performance. Other systems, such as gearing mechanisms located in wheel hubs, have been commercialized to address the shortcomings of the derailleur systems available.

The continuous improvement on the derailleur system has allowed it to maintain its superiority in the marketplace, as the improvements made on the system have focused on successful improvements in efficiency, weight and cost. These three variables are typically considered most important by cyclists.

However, the derailleur system has inherent design shortcomings. First, the system cannot change gears to change the torque ratio while in static position. This requires the cyclist to resort to planning ahead to downshift prior to stopping, if there's an option to do so in the first place. They may also have to resort to holding up their back tire and cycling the crank until the derailleur can shift the gears, which is difficult to do and cumbersome.

Second, the derailleur system is exposed to the environment and cyclist, negatively effecting the system efficiency. This creates many significant issues, depending on the desired use. The chain drive, while highly efficient when clean and lubricated, loses efficiency fairly rapidly as it collects dirt during use. As a result, the chain drive requires constant cleaning and lubrication to maintain its efficiency. This lubricant can in some cases promote the accumulation of dirt on the chain, not to mention becoming a chronic source of chain grease mess on the cyclist's leg.

Third, this exposure leads to the derailleur system being vulnerable to damage, or at the very least, falling out of indexing calibration. This leads to expensive maintenance costs. This damage can occur as easily as the cycle falling over from a static or standing position, or more commonly falling over when riding on challenging terrain.

Wheel hub transmission designs have become fairly popular because the torque changing mechanism is protected within a sealed housing. This addresses the efficiency and robustness issues of the derailleur system. They also can employ the use of a flexible belt drive between the crank and the hub, which replaces the chain and its associated deficiencies. However, these commercialized designs, such as the Shimano Alfine and the Rohloff Speedhub, typically have lower starting efficiency, typically don't have the widest torque ratio range and are significantly heavier than the derailleur designs.

To the latter, the additional weight onto the rear wheel is considered a negative when it comes to mountain bike riding. It adds to the un-sprung weight of the rear suspension (i.e., the more weight in the rear wheel and stays of the bike frame produces more upward inertia when riding over a bump, which negatively impacts the rear wheel traction), reducing the suspension performance.

In recent years, newer transmission designs have been commercialized to address the shortcomings of the derailleur system. The Enviolo NuVinci system utilizes a toroidal variator system to provide infinitely variable torque options within its range. This system allows the cyclist to dial in their desired ratio, rather than relying on the indexed steps of the derailleur system, steps which can range from 16-30% on each index.

However, the Enviolo NuVinci system has many shortcomings. It is significantly heavier than the derailleur system, is located in the wheel hub, has a smaller torque ratio range (approximately 352% compared to the best derailleur system providing up to 550%), and it has significantly lower efficiency, due to the inherent limitations of this variator requiring significant clamping force on the roller ball surfaces to keep the engagement from slipping.

Two other designs have been successfully commercialized that employ a traditional gearbox system, utilizing palls to change torque ratios. Both systems require a unique change to the cycle frame to accommodate the bottom bracket mounting location. The Pinion system has successfully been configured into bicycle designs by over one hundred manufacturers. By being located at the bottom bracket location, it centers the weight of the cycle for improved balance and, for rear suspension bikes, it reduces the un-sprung weight.

The latter benefit reduces the upward inertia of the rear wheel and stays set upon hitting a bump, which improves the rear wheels contact and traction with the ground. The Pinion system is available in ratio ranges up to 676%, with even indexed steps. The Pinion system also allows the cyclist to shift in static position, as it utilizes a pall system to change gear ratios. The most significant advantage of the Pinion system is that the shifting mechanism is sealed and protected in a housing. Like wheel hub designs, the torque change mechanism is protected, maintaining system efficiency, reducing maintenance, and risk of damage. It also allows for the use of flexible belt drives.

The downsides of the Pinion design are significant enough to mitigate its full market adoption. First, along with wheel hub designs, the system is significantly heavier than the derailleur system, up to 100% more. This is mostly driven by the necessity to use steel for the meshing gears to ensure durability. Second, it cannot shift gears under load very well, which requires the cyclist to delay pedaling while the pall changes gear. This can be a significant issue for mountain bike applications, where the cyclist may need to suddenly change gears on a steep or challenging trail without losing momentum.

Due to the pall system, it has effectively a second freewheel, with 14 to 22 engagement points. This creates a delay in the engagement of the torque drive system, which limits the cyclist from being able to effectively ratchet up difficult obstacles via momentarily reversing the crank rotation a certain degree and then driving forward. The gearbox designs inherently have lower efficiency (90-95%) than a clean derailleur system due to the inherent losses in the gearbox design. Lastly, the gearbox design, like the wheel hub designs, requires periodic oil changes, which has the potential of leaks and adds to the cyclist's maintenance burden.

Another commercialized gearbox design is the Effigear. It has many of the same advantages and disadvantages as the Pinion gearbox, but with some mirror differences. It has only 9 gear ratio options, so its torque ratio range is only 469% with large, non-uniform percentage steps in between each gear. However, its pall mechanism has 48 engagement points, allowing for a cyclist to more effectively ratchet.

Again, whether it is a road bike, mountain bike, beach cruiser or other style—it is the rider who provides power through his or her legs to make the bike go—thus moving himself/herself and the bike over the terrain that is being covered. Additional weight in a transmission system requires additional effort to simply be moved. Issues with when and how fast a change in gears can be performed can be not only challenging for the rider, but very potentially dangerous. And efficiency of the rider's effort being translated into the mechanical motion of bicycle is quite important to the rider, for again any loss in efficiency essentially means he or she must work harder and/or longer than might otherwise be most desired.

Hence there is a need for a method and system that is capable of overcoming one or more of the above identified challenges.

SUMMARY OF THE INVENTION

Our invention solves the problems of the prior art by providing novel systems and methods for a bicycle transmission that is low maintenance, highly efficient, low weight, compact in size, has a wide torque ratio range and located at the bottom bracket position for ideal center of gravity balance.

In particular, and by way of example only, according to at least one embodiment, provided is a bicycle transmission including: a housing with a first shaft passing therethrough; a set of two cones in opposing parallel alignment disposed within the housing, the first cone engaged about the first shaft, the second cone engaged about a second shaft parallel to the first shaft, the second shaft structured and arranged to have at least a proximal position and a distal position relative to the first shaft; a driver disposed generally normally about one of the two cones and passing therebetween, the driver structured and arranged to engaging a portion of the first cone with a portion of the second cone when the second cone is in the proximal position; a driver mover structured and arranged to move the driver between the cones when the second cone is in the distal position; and a transfer element joined to an end of the second shaft.

For yet another embodiment, provided is a bicycle transmission including: a housing with a first shaft passing therethrough; a first cone disposed with the housing and engaged about the first shaft; a second cone disposed within the housing and engaged about a second shaft parallel to the first shaft, the second cone in opposing parallel alignment to the first cone, the second shaft having a first end and a second end; a cone adjuster comprising: a first eccentric cam disposed in a bearing, the first eccentric cam receiving the first end of the second shaft; and a second eccentric cam coupled to a cam rotator, the second eccentric cam receiving the second end of the second shaft, the first eccentric cam and the second eccentric cam permitting the second cone to move between the proximal position and the distal position by activation of the cam rotator to rotate the second eccentric cam about a central axis; a driver disposed generally normally about one of the two cones and passing therebetween, the driver structured and arranged to engage a portion of the first cone with a portion of the second cone when the second cone is in the proximal position; a driver mover structured and arranged to move the driver between the cones when the second cone is in the distal position; and transfer element joined to an end of the second shaft.

Still, for yet another embodiment, provided is a bicycle transmission including: a housing with a first shaft passing therethrough; a first cone disposed within the housing and engaged about the first shaft; a second cone substantially equivalent to the first cone in opposing parallel orientation, the second cone engaged about a second shaft disposed within the housing parallel to and offset from the first shaft, the second shaft supported by a first eccentric cam disposed in a circular bearing and a second eccentric cam coupled to a cam rotator, the eccentric cams permitting the second cone to have at least a distal position relative to the first cone and a proximal position relative to the first cone; a driver disposed generally normally about one of the two cones and passing therebetween, the driver structured and arranged to engaging a portion of the first cone with a portion of the second cone when the second cone is in the proximal position; a driver mover structured and arranged to move the driver between the cones when the second cone is in the distal position; and a transfer element joined to an end of the second shaft.

BRIEF DESCRIPTION OF THE DRAWINGS

FIG. 7 is an end view of the second conical gear assembly in the distal position relative to the first conical gear assembly in accordance with at least one embodiment of the present invention;

DETAILED DESCRIPTION

Before proceeding with the detailed description, it is to be appreciated that the present teaching is by way of example only, not by limitation. The concepts herein are not limited to use or application with a specific system or method a bicycle transmission. Thus, although the instrumentalities described herein are for the convenience of explanation shown and described with respect to exemplary embodiments, it will be understood and appreciated that the principles herein may be applied equally in other types of systems involving human-powered or power-assisted drive systems where it is advantageous to have an enclosed, highly efficient, high torque ratio transmission system.

Examples of applications where the invention can improve performance are different variations of human-powered bikes and water craft (i.e., road bike, gravel bike, cyclocross bike, hybrid bike, mountain bike, beach comber bike, fat bike, incumbent bike, rickshaw bike, paddle boats, peddle assist kayaks), and power-assisted bikes, where versions of the above-mentioned examples incorporate a motor and battery to augment the cyclist's effort. The invention can also be advantageous in applications such as machining equipment, motor powered vehicles, aircraft, autonomous vehicles, etc. where the combination of a high torque ratio, high efficiency, compact size and low weight transmission is desired or required.

This invention is described with respect to preferred embodiments in the following description with references to the Figures, in which like numbers represent the same or similar elements. It will be appreciated that the leading values identify the Figure in which the element is first identified and described, e.g., element 100 first appears in FIG. 1.

Figure 1A:
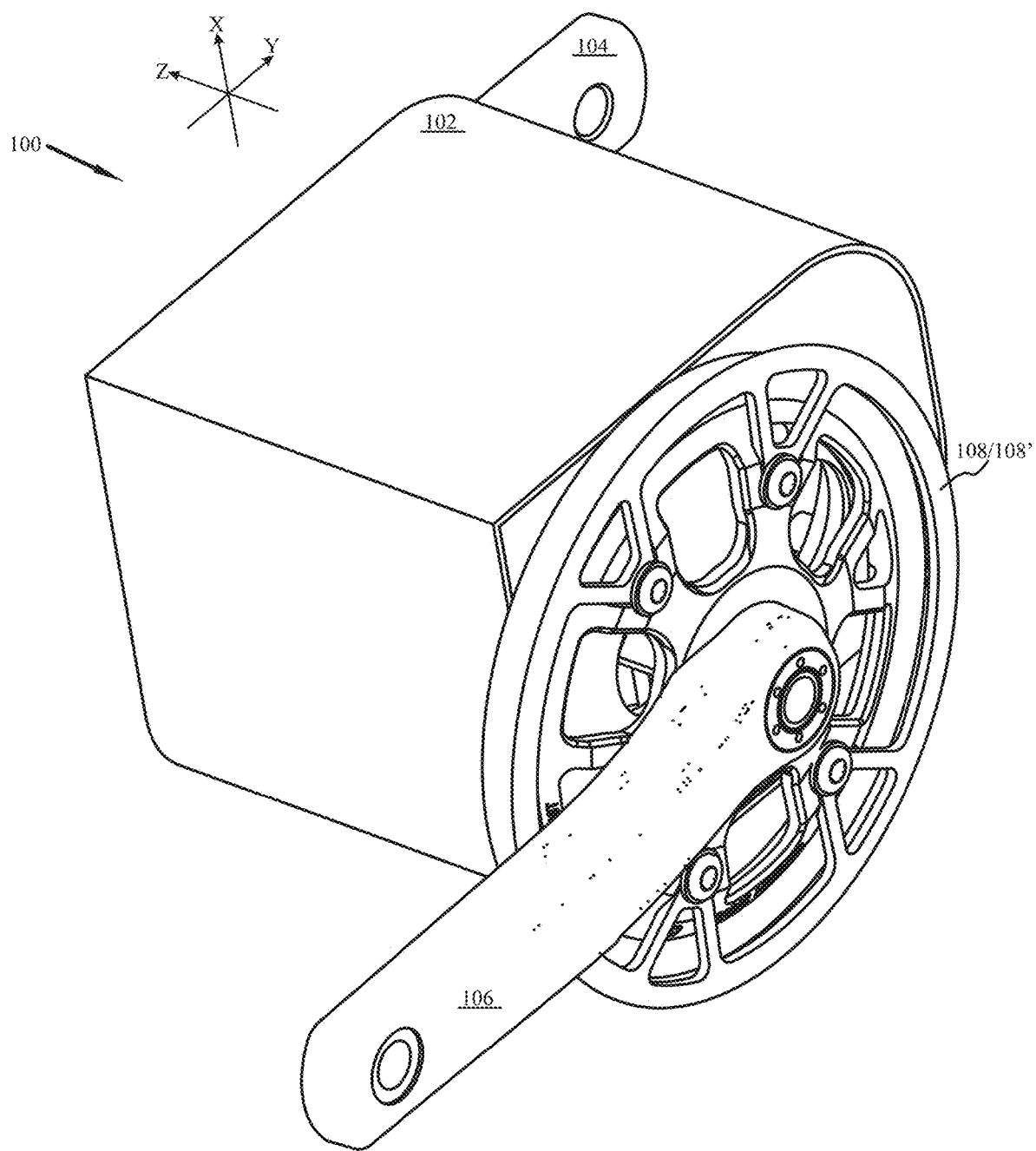
FIG. 1A is a right-side perspective of the conical gear bicycle transmission in accordance with at least one embodiment of the present invention.
Figure 1B:
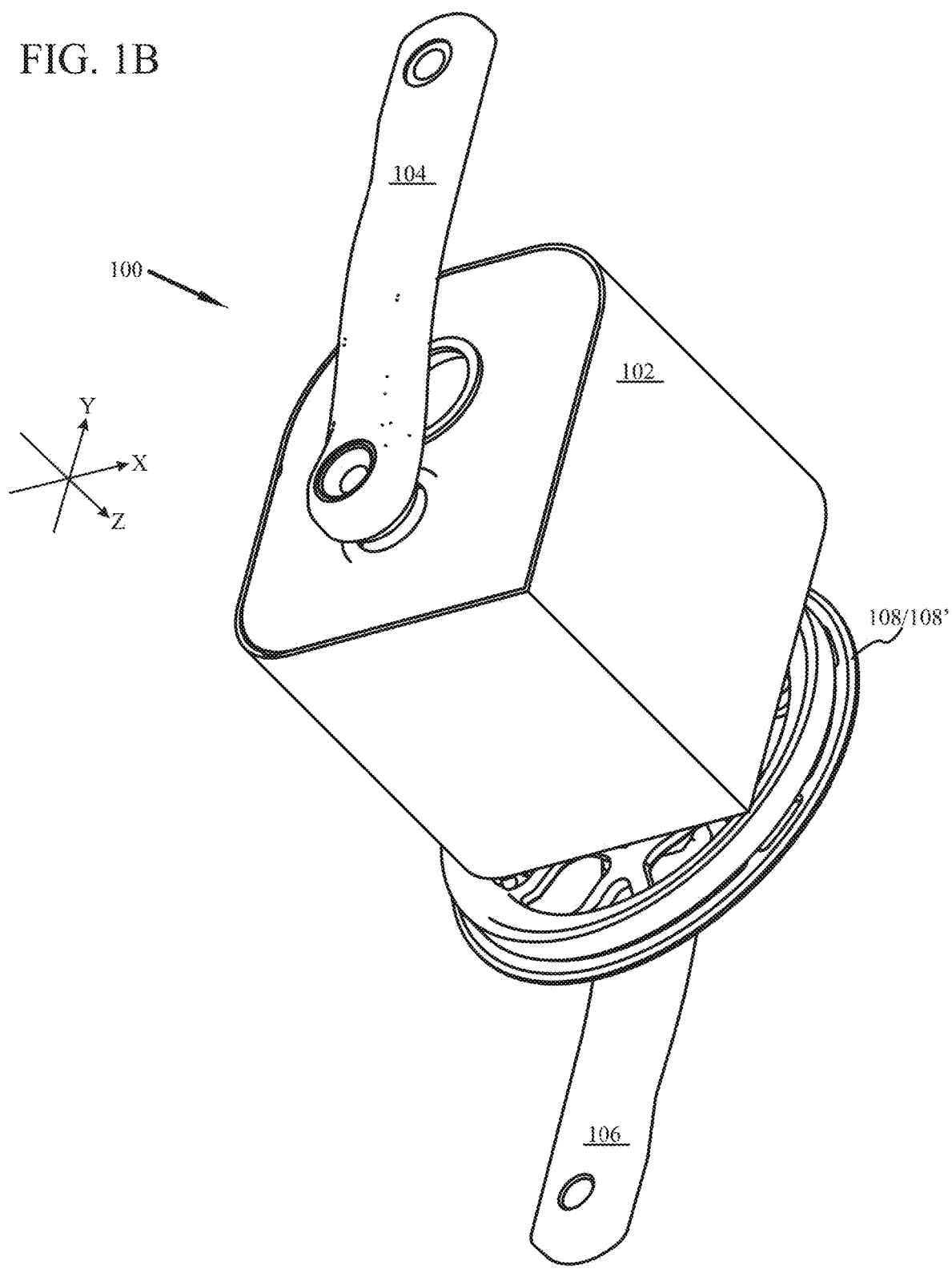
FIG. 1B is a left-side perspective of the conical gear bicycle transmission in accordance with at least one embodiment of the present invention.

Turning now to the figures, and more specifically FIGS. 1A and 1B there is shown an embodiment of a bicycle transmission—which with respect to the figures and following description will be understood and appreciated as an enclosed conical gear bicycle transmission 100, hereinafter CGBT 100. FIG. 1A presents a right-side perspective view of CGBT 100 and FIG. 1B presents a left-side perspective view.

To facilitate the description of systems and methods for embodiments of CGBT 100, the orientation of CGBT 100 as presented in the figures is referenced to the coordinate system with three axes orthogonal to one another as shown in FIG. 1. The axes intersect mutually at the origin of the coordinate system, which is chosen to be the center of CGBT 100, however the axes shown in all figures are offset from their actual locations for clarity and ease of illustration.

With respect to both views, it will be easily appreciated that CGBT 100 is essentially an enclosed transmission system, as a housing 102 substantially encloses the transmission gearing system. A left crank 104, right crank 106 and driver 108 (such as a chain ring 108') are also shown, but it will be understood and appreciated that the left crank 104, right crank 106 and driver 108 may be specifically selected for a given rider and/or intended bicycle riding conditions for which the CGBT 100 is advantageously utilized. In addition, the left crank 104 and right crank 106 may also be referred to as the left crank arm 104 and the right crank arm 106 without departure from the present invention.

Figure 2:
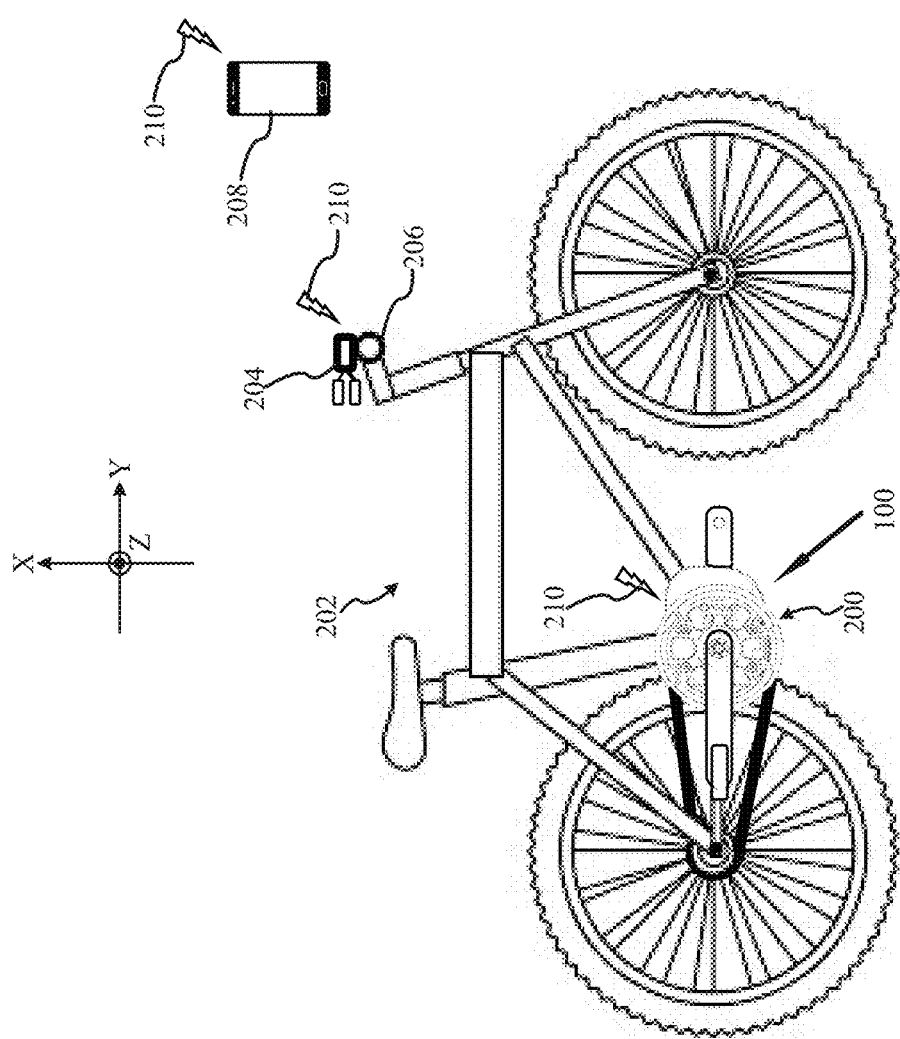
FIG. 2 is a general concept illustration of a bicycle with a conical gear bicycle transmission in accordance with at least one embodiment of the present invention.

Turning to FIG. 2, it will be understood and appreciated that for at least one embodiment CGBT 100 is structured and arranged in a compact form so as to fit within the form factor of a bottom bracket location 200 for a given bicycle 202, and may interface with a controller 204 on the handlebars 206 or other location upon the bicycle frame that the bicyclist uses to switch gear ratios. For at least one embodiment, the controller 204 on the handlebars may be presented with the appearance of traditional bicycle shift controllers—a left shifter and a right shifter, which may be cable driven or wireless communication (shown by wireless transmission signals 208) depending on the embodiment of the CGBT 100 employed. Of course, it will be understood and appreciated that for at least one embodiment, bicycle 202 may be an e-bike into which an embodiment of CGBT 100 has been disposed.

For at least one embodiment CGBT 100 may also wirelessly interface with a user's remote computing device, such as a smart phone 206. The interface between the CGBT 100 and the controller 204 may be cable, electrical wiring or wireless transmission, e.g., ANT+, WiFi, Bluetooth, or other data exchange medium. In addition, for at least one embodiment CGBT 100 incorporates electronic controls to provide a transmission performance exceeding that offered by current commercialized designs.

Figure 3A:
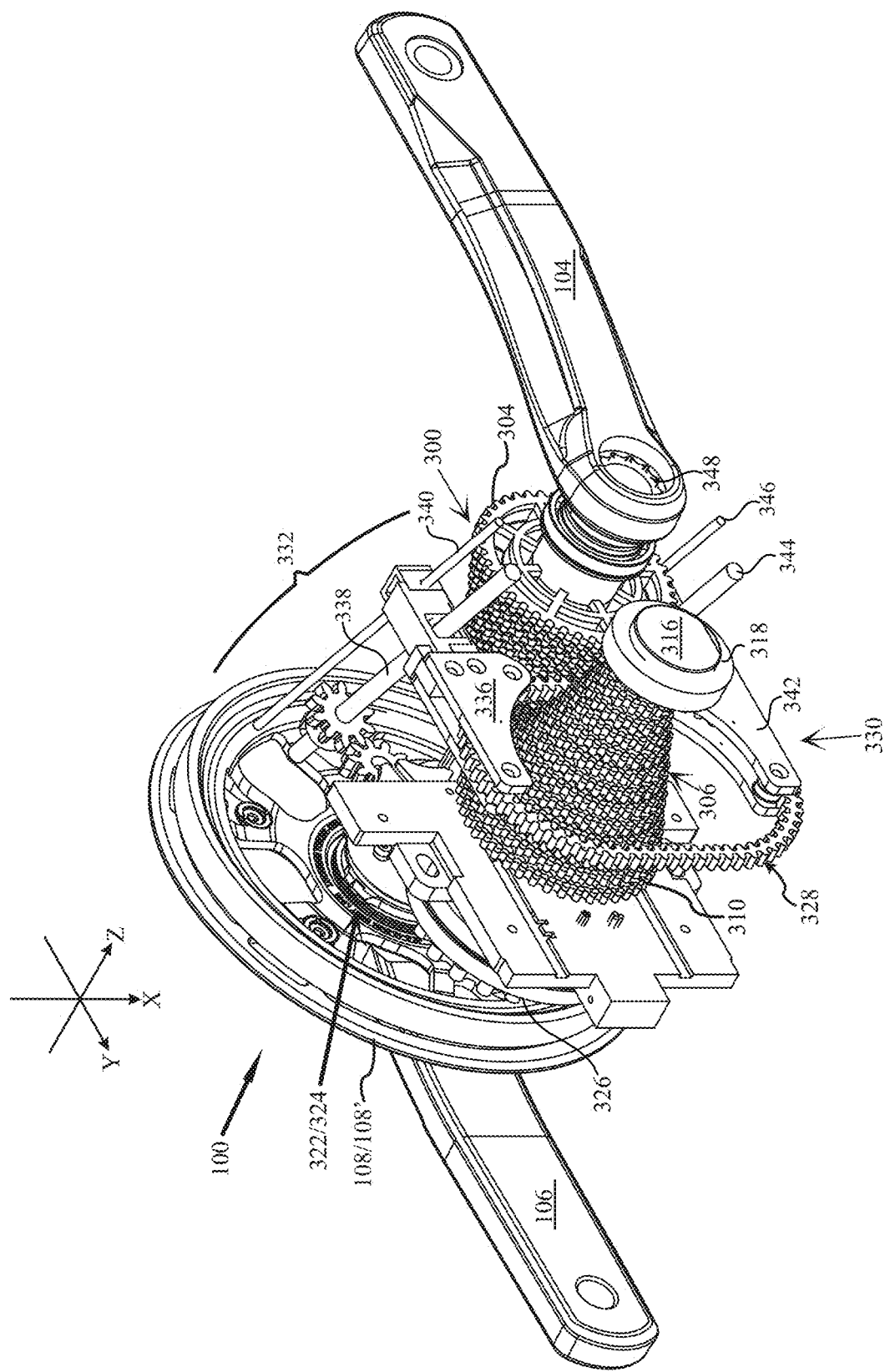
FIG. 3A is an exposed, left-side perspective view of a conical gear bicycle transmission in accordance with at least one embodiment of the present invention.
Figure 3B:
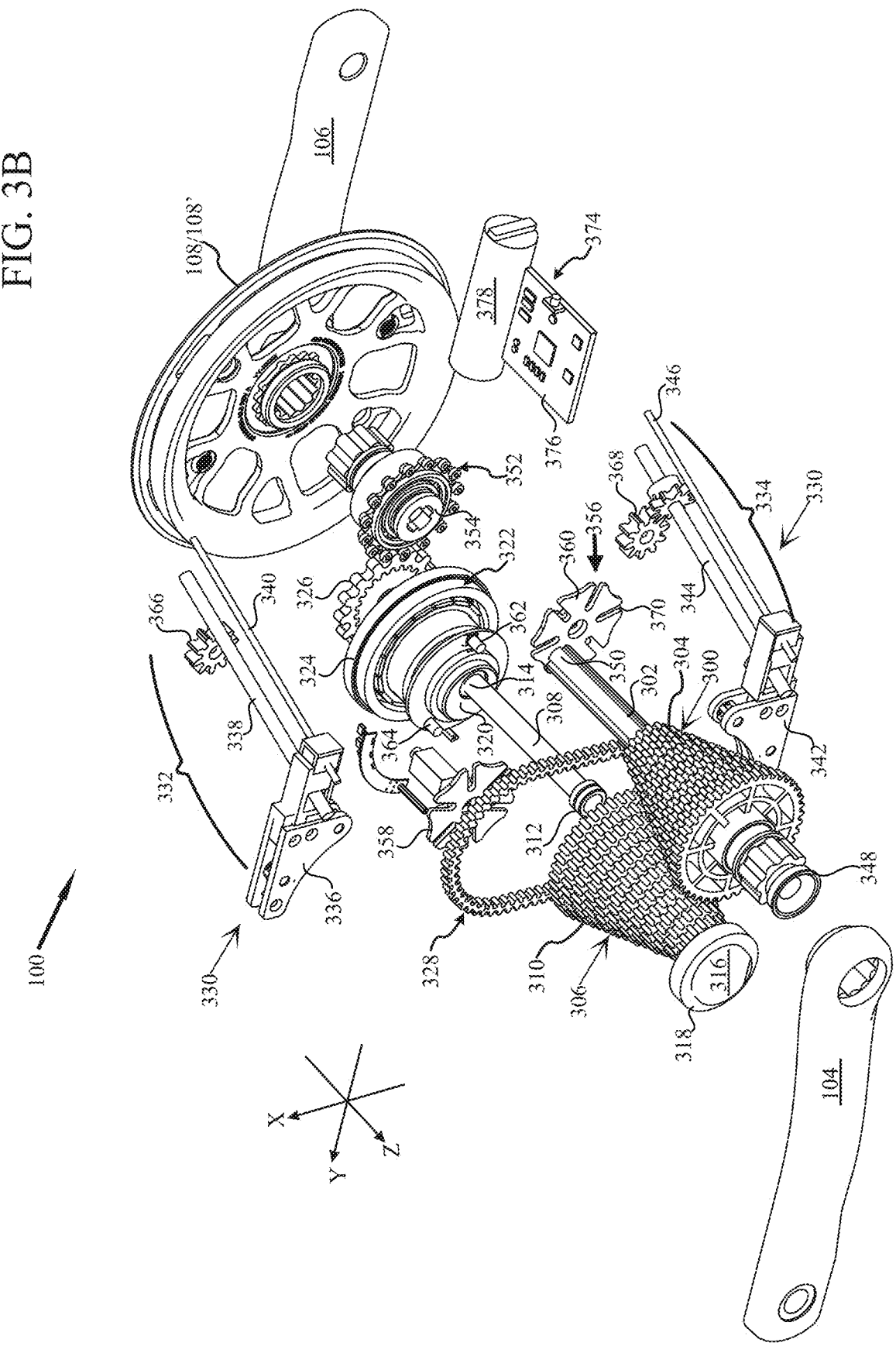
FIG. 3B is an exploded, left-side perspective view of a conical gear bicycle transmission in accordance with at least one embodiment of the present invention.

FIGS. 3A and 3B provided an assembled perspective view in FIG. 3A and an exploded perspective view in FIG. 3B of CGBT 100 with the housing removed for ease of illustration and discussion, and with respect to FIGS. 3A and 3B, the advantageous nature of CGBT 100 incorporating a belt and clutch design in an advantageous and novel way may be more fully realized.

As shown most clearly in the exploded view of FIG. 3B, for at least one embodiment CGBT 100 includes two opposing conical structures with an engageable transfer element such that the first conical structure as a driver transfers rotational torque to the second conical structure. For an embodiment as shown, this is provided by a first conical gear assembly 300 engaged about a first shaft 302. More specifically the first conical gear assembly 300 has a plurality of first gears 304, each of a different size and arranged in a first progressive order. CGBT 100 also has a second conical gear assembly 306 engaged about a second shaft 308 that is parallel to the first shaft 302, this second conical gear assembly 306 having a plurality of second gears 310, each of a different size and arranged in a second progressive order that is opposite to the first progressive order.

The second shaft 302 has a first end 312 and a second end 314, the first end 312 disposed through the second conical gear assembly 306 and engaging with a first eccentric cam 316. For at least one embodiment, the first eccentric cam 316 is disposed in a bearing 318. The second end 314 of the second shaft 308 is engaged with a second eccentric cam 320 which is coupled to a cam rotator 322, e.g., a device structured and arranged to rotate the second eccentric cam 320 clockwise or counter-clockwise one full revolution so as to effectuate a transition between first gears 304 and second gears 310 as is further described below. For at least one embodiment the second end 314 passes through a bearing associated with second eccentric cam 320 and is coupled to an outer transfer gear 326.

For at least one embodiment the cam rotator 322 is activated by a manual cable system, where the user can shift gear ratios by manually shifting a continuous loop cable or dual cables to rotate the cam rotator 322 via shifting levers on the bicycle handlebars. For at least one such embodiment, there are two shifting levers, one for upshifting and one for downshifting. One full stroke of a shifting lever is designed to rotate the motor drive 180 or 360 degrees, thus completing a full shift cycle. Such a cable system may be desired for embodiments where the user/cyclists does not wish to deal with a battery pack, and the resultant weight of the transmission system will be lighter.

For yet another embodiment, the cam rotator 322 is an electrically powered torque motor 324, also referred to as a servo motor or stepper motor. The use of a torque motor 324 may be desired for certain embodiments as it provides faster shifting, less actuation force by the bicyclist's fingers, eliminates the potential issues of cable stretch and adjustment, and may be deemed more consistent by some users.

Moreover, for at least one embodiment the second eccentric cam 320 is fixedly coupled to an electrically powered torque motor 324, and more specifically, is disposed within the aperture of a wide aperture torque motor. As is further discussed below, to shift from one gear set to another, the torque motor 324 rotates three hundred sixty degrees either clockwise or counter clockwise depending on whether the CGBT 100 is upshifting or downshifting.

It will be appreciated that the first eccentric cam 316 and the second eccentric cam 320 permit the second conical gear assembly 306 to have at least a distal position relative to the first conical gear assembly 300 and a proximal position relative to the first conical gear assembly 300 as established by the torque motor 324.

A drive belt 328 is disposed generally normally about one of the two conical gear assemblies and passes therebetween as a mechanical conduit to transfer the rotational torque from the driving first conical gear assembly 300 to the driven second conical gear assembly 306. As such, it may also be appreciated that the first shaft 302 is a drive shaft and the second shaft 308 is a driven shaft. For at least one embodiment the drive belt 328 is a double-sided toothed drive belt. As such, the teeth of a first gear 304 and the teeth of a second gear 310 simultaneously engaged with opposite sides of the drive belt 328.

With respect to the advantageous embodiment of the drive belt 328 passing between the first conical gear assembly 300 and the second conical gear assembly 306, it will be understood and appreciated that in such a configuration, the drive belt 328 is actually under compression as between the two conical assemblies, but otherwise slack/loose. As such, the drive belt 328 is not under expansive tension as with a traditional chain or belt configuration, and may therefore not incur stretching as is often an occurrence with a chain, belt or cable.

It will be understood and appreciated, that for at least one alternative embodiment, the drive belt 328 may disposed about the outside of both first conical gear assembly 300 and the second conical gear assembly 306 for substantially similar operation of the CGBT 100 with the proximate and distal relationship of the second conical gear assembly 306 to the first conical gear assembly 300 essentially reversed, e.g., the drive belt is under tension and engaging the second conical gear assembly 306 at the distal position and unengaged at the proximal position.

Figure 12:
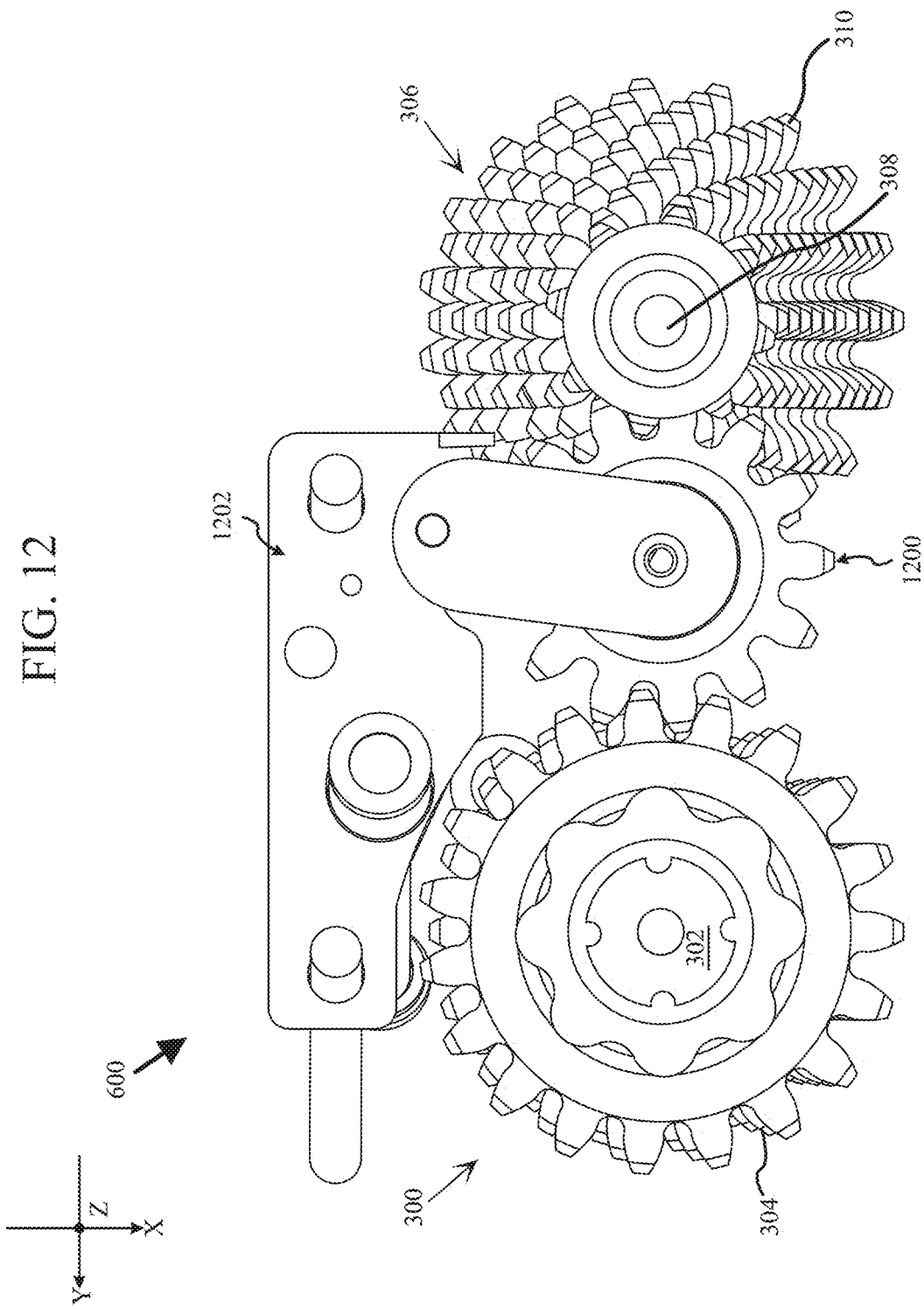
FIG. 12 is an end view of the conical gear assembly with the driver as a transfer wheel on a spring-loaded transfer wheel arm in accordance with at least one embodiment of the present invention.

Further still, it may be understood and appreciated that for yet another embodiment, the belt drive is replaced with a transfer wheel on a spring-loaded transfer wheel arm, such that the first conical gear assembly transfers the torque to the second conical gear assembly via the transfer wheel when the second shaft is in proximal position to the first shaft. More specifically, FIG. 12 shows a simplified end view with the driver as a transfer wheel 1200 on a spring-loaded transfer wheel arm 1202, the transfer wheel 1200 disposed between the first conical gear assembly 300 and the second conical gear assembly 306. This alternative embodiment employing a transfer wheel 1200 may also be appreciated in the perspective view of FIG. 13, which further shows a high torque motor 1300 coupled to the CGBT 100 to provide additional power augmentation.

Figure 14:
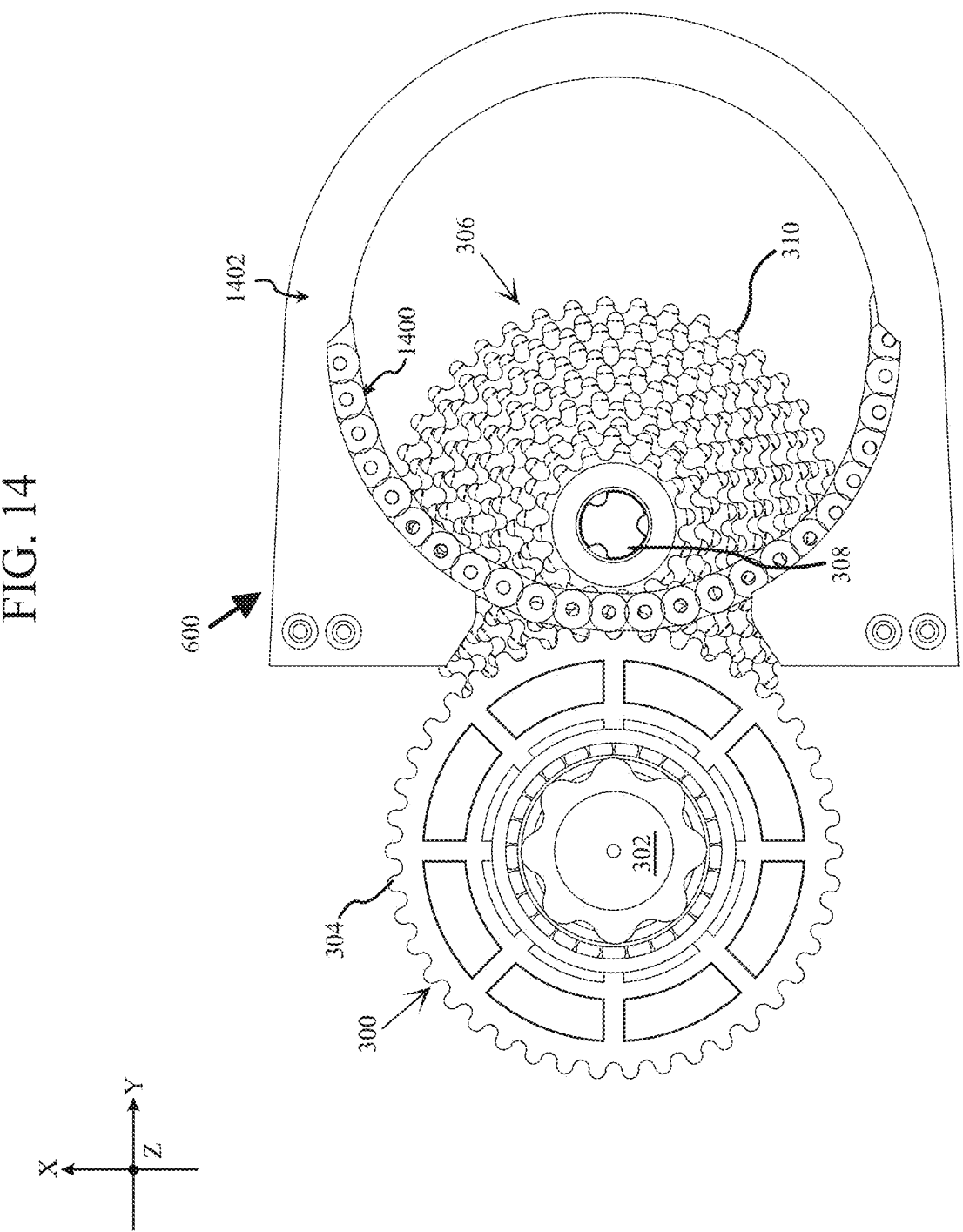
FIG. 14 is an end view of the conical gear assembly with the driver as a chain in accordance with at least one embodiment of the present invention.

Although a drive belt 328 is anticipated to be a belt for at least one embodiment, those skilled in the art will appreciate that a chain or cable may be substituted with appropriate alteration of the respective conical gear assemblies to engage a chain or cable without departure from the scope of the present invention. More specifically, FIG. 14 shows a simplified end view with the driver as a chain 1400 with an associated chain guide 1402 disposed about the second cone of gears 310.

For at least one embodiment, the drive belt 328 is manufactured from a flexible polymer material, which may also include fibrous material, such as carbon fiber, in a composite format to provide stiffness and durability to its form. In addition, for at least one embodiment, the first conical gear assembly 300 and the second conical gear assembly 306— and more specifically the first gears 304 and second gears 310 comprising each assembly, are made from a strong, lightweight material, such as magnesium alloy, aluminum alloy or titanium and its respective alloys, that can effectively support the load and shear force created by the cyclist's torque via the cranks. For embodiments where the first gears 304 and second gears 310 are provided by material is an aluminum alloy, magnesium alloy or titanium and its respective alloys, a hard anodized coating and or a wear-resistant coating, such as titanium nitride, can be applied to reduce wear from long term use.

For the exemplary embodiment as shown, the drive belt 328 is disposed about the second conical gear assembly 306. As will be further explained below, the drive belt 328 engages one of the first gears 304 to one of the second gears 310 when the second conical gear assembly 306 is in the proximal position.

When the second conical gear assembly 306 is in the distal position—and therefore disposed away from the first conical gear assembly 300, at least one drive belt mover 330 is structured and arranged to move the drive belt 328 along the progressive order.

For at least one embodiment, at least one drive belt mover 330 is provided at least in part by a first belt guide assembly 332. While a first belt guide assembly 332 may be desirable for embodiments striving for weight reduction, a single first belt guide assembly 332 is sufficient for at least one embodiment to achieve a change from one gear set to another, for at least one alternative embodiment, the drive belt mover 330 of CGBT 100 includes a second belt guide assembly 334.

As shown, for at least one embodiment, the first belt guide assembly 332 has a first belt guider 336, such as, but not limited to, a belt cage disposed about at least a portion of the drive belt 328. The belt guider 336 is structured and arranged to guide the drive belt 328 about the second conical gear assembly and during latter movement of the drive belt 328 from one gear set to another, a first linear actuator 338 and a first support rail 340. For the embodiment as shown, the first linear actuator 338 is a first linear drive screw passing through the first belt guider 336. When the first linear drive screw is rotated, the screw profile engages a matching screw profile within the first belt guider 336, thus advancing or retracting the first belt guider 336 along a plane parallel to the gap between the first conical gear assembly 300 and the second conical gear assembly 306.

The second belt guide assembly 334 may be substantially symmetrical to the first belt guide assembly 332, having a second belt guider 342 (such as, but not limited to, a belt cage), a second linear actuator 344 and a second support trail 346. And again, for the embodiment as shown, the second linear actuator 344 is a second linear drive screw passing through the second belt guider 342. When the second linear drive screw is rotated, the screw profile engages a matching screw profile within the second belt guider 342, thus advancing or retracting the second belt guider 342 along a plane parallel to the gap between the first conical gear assembly 300 and the second conical gear assembly 306.

Returning to the first conical gear assembly 300, the first shaft 302 has a first end 348 that extends through the housing (not shown) so as to engage with the left crank 104. The first shaft 302 also has a second end 350 that is disposed in a non-binding fashion through a sprocket gear assembly 352 to engage with the right crank 106. For at least one embodiment, the second end 350 is disposed through a bearing 354 disposed within the sprocket gear assembly 352.

Those skilled in the art will appreciate that a Geneva mechanism, also referred to as a Geneva drive or Maltese cross is a gear mechanism that translates a continuous rotation movement into intermittent rotary motion. With respect to the present invention, CGBT 100 advantageously employs Geneva mechanism 356 to synchronize the linear motion of the drive belt mover 330 with the transition between the distal position and proximal position of the second conical gear assembly 306.

More specifically, the torque motor 324 operates to transition the second conical gear assembly 306 from a proximal position to a distal position and then back to a proximal position in one full rotation of the torque motor 324. The movement of the drive belt mover 330 to transition the drive belt 328 from one set of first and second gears to the next is typically far less movement than is the displacement of the second conical gear assembly between the proximate and distal position. The use of a Geneva mechanism 356 advantageously permits one primary action—the rotation of the torque motor 324 to drive both tasks—the transition of the second conical gear assembly 306 between the proximal and distal positions as well as the movement of the drive belt mover 330.

For the embodiment as shown, this Geneva mechanism 356 includes a first Geneva gear 358 and a second Geneva gear 360 each in turn triggered by first pin 362 or a second pin 364 as provided by the second eccentric cam 320. The first Geneva gear 358 is engaged to a first gear 366 which is engaged with the first linear actuator 338, and the second Geneva gear 360 is coupled to a second gear 368 that is engaged with the second linear actuator 344. As shown, the first Geneva gear 358 and the second Geneva 360 gear have slots 370, which as further explained below, engage with the first pin 362 or second pin 234.

Figure 3C:
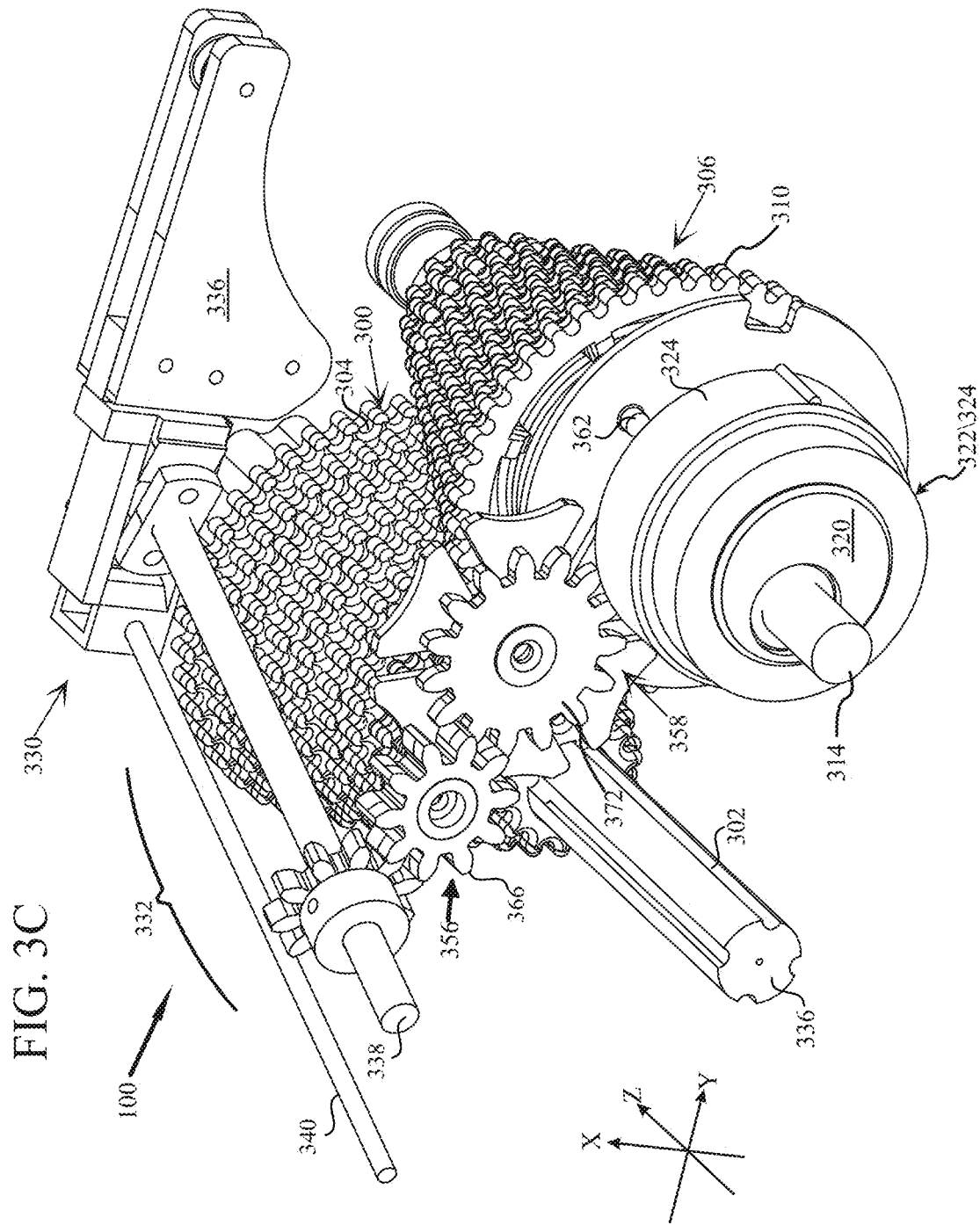
FIG. 3C is a right-side partial perspective view of a conical gear bicycle transmission in accordance with at least one embodiment of the present invention.

The arrangement of the Geneva mechanism 356 as provided at least in part by the first Geneva gear 358 and the first gear 366 engaging with the linear actuator 338 may be more fully appreciated in FIG. 3C which presents a partial right side perspective view of a portion of the CGBT 100 assembly. With specific reference to FIG. 3C, it may also be appreciated that the first Geneva gear 358 provides a coupler gear 372 that engages with first gear 366. The second Geneva gear 360 likewise has a coupler gear, but is not shown in FIG. 3C for ease of illustration and discussion, and cannot be fully observed in FIG. 3A or 3B.

Moreover, when the first pin 362 or second pin 364 (not shown in FIG. 3C) imparts rotation to the first Geneva gear 358, the first gear 366 will also rotate and impart rotation to the first linear actuator 338 thus moving the first belt guider 336 to transition the drive belt 328 (not shown in FIG. 3C) to a different set of gears. Likewise, when the first pin 362 or second pin 364 imparts rotation to the second Geneva gear 360 (not shown in FIG. 3C) the second gear 368 (not shown in FIG. 3C) will also rotate and impart rotation to the second linear actuator 344 (not shown in FIG. 3C) thus moving the second belt guider 342 (not shown in FIG. 3C) to transition the drive belt 328 to a different set of gears.

More specifically, and for ease of description explained with request to the first Geneva gear 358, when the torque motor 324 is activated to rotate clockwise or counter clockwise, the first pin 362 or the second pin 364 will engage with the slots 370 on the first Geneva gear 358, intermittently rotating the first Geneva gear 358, who's fixedly connected gear profile engages and rotates the first gear 366, which engages and rotates the first linear actuator 338. The nesting of the Geneva mechanism 356 to the radial profile of the second eccentric cam 320/cam rotator 322 locks the drive belt mover 330 in position until the second eccentric cam 320/cam rotator 322 is rotated again. This keeps the drive belt mover 330 locked in place and always calibrated so that it aligns the drive belt 328 with each gear stage.

The ratio of the gear in the Geneva mechanism 356, the first gear 366 and the first linear actuator 338 is such that a 360-degree revolution of the cam rotator 322 moves the drive belt mover 330 a precise, indexed amount to advance the drive belt 328 from one gear stage nominal position to another. The intermittent action of the Geneva mechanism 356 delays the indexing of the drive belt 328 until the second conical gear assembly 306 has rotated distally enough away from the first conical gear assembly 300 (proximal position to distal position) so that the drive belt 328 is no longer tightly held between the two conical gear assemblies and can move laterally freely between gear stages.

The rotational shifting of the driven conical gear assembly and the drive belt mover 330 is fixedly coordinated as to provide a quick and efficient gear change with minimal disruption to the user's transfer of torque from the cranks to the rear wheel. It also easily allows the cyclist to shift when the bike not being pedaled and static, as well as when the drive is under high torque load.

Returning to FIG. 3B, a control unit 374 is also disposed with in the housing 102 (not shown), which for at least one embodiment is essentially a printed circuit board 376 ("PCB") control board with a battery 378 structured and arranged to activate the torque motor 324 in response to a control signal.

For at least one embodiment, this control signal may be provided by the cyclist, such as through the controller 204 as noted above. For yet another embodiment, the control signal may be provided by CGBT 100 itself in response to at least one pre-determined torque load detected upon either the first shaft 302 or the second shaft 308. Moreover, in at least one embodiment, CGBT 100 may include one or more torque sensors disposed proximate to the first shaft 302 and/or the second shaft 308. When the control unit 374 is provided with instructions regarding torque ratios, measurements from the one or more torque sensors as feedback to the CGBT 100 may be used to determine automatic shifting. Further still, these settings may be user adjusted through the use of the controller 204 such that the user can modify, engage or disengage the automated feature while the bicycle, and more specifically the CGBT 100 is in active use.

For at least one embodiment, the cyclist/user may also initiate a special control signal, such as by the prolonged holding/pressing of a shift lever on the handlebars. Such a special control signal may immediately direct the CGBT 100 to drop the torque ratio to its lowest state. This is particularly useful in cases where a cyclist may be starting up from a static position, or where a cyclist may quickly encounter a rapid change in road or trail inclination. For at least one embodiment, the opposite feature may also be offered, such as where a prolonged holding/pressing of a different shift lever on the handlebars immediately directs the CGBT 100 to immediately rise to the highest torque ratio state.

The battery 378 provides sufficient current and voltage, such as between 3 and 60 volts, to effectively operate the shifting system of CGBT 100. Although shown for ease of illustration and description as incorporated within CGBT 100, it will be understood and appreciated that the battery can be permanently installed within the sealed housing or a location in or on the bicycle frame, or it can be designed to be easily removable so that it can be replaced by a fully charged battery by the cyclist on long excursions. The battery 378 can be charged by an external charging adapter that would plug into a power input receiver, such as a micro-sub connector. The battery 378 can also be charged by a wireless charging system, where an antenna receiver is located within the sealed housing and electrically connected to the control unit.

To summarize, for at least one embodiment an advantageous CGBT 100 is provided by a housing 102 with a first shaft 302 passing therethrough; a set of two conical gear assemblies in opposing parallel alignment disposed within the housing 102, each having a plurality of different sized gears arranged in a progressive order, the first conical gear assembly 300 engaged about the first shaft 302, the second conical gear assembly 306 engaged about a second shaft 308 parallel to the first shaft 302, the second shaft 308 structured and arranged to have at least a proximal position 600 and a distal position 700 relative to the first shaft 302; a drive belt 328 disposed generally normally about one of the two conical gear assemblies and passing therebetween, the drive belt 328 engaging a gear from the first conical gear assembly 300 with a gear from the second conical gear assembly 306 when the second conical gear assembly 306 is in the proximal position 600; at least one drive belt 328 mover structured and arranged to move the drive belt 328 along progressive order of gears when the second conical gear assembly 306 is in the distal position 700; and a driver 108 joined to an end of the second shaft 308.

With respect to this descriptive overview, the operation of CGBT 100 may be described as follows. The cyclist drives pedals attached to the left crank 104 and the right crank 106 which in turn provide rotation to the first shaft 302 and more specifically, rotation to the first conical gear assembly 300. With the second conical gear assembly 306 in the proximal position, the drive belt 328 engages a first gear 304 of the first conical gear assembly 300 with a second gear of the second conical gear assembly 306 such that the rotation of the first conical gear assembly 300 drives the rotation of the second conical gear assembly 306. The relationship between the first gear 304 engaged with the second gear 310 mechanically determines whether the second conical gear assembly 306, and more specifically the second shaft 308, rotates faster, slower, or at about the same rate as the first shaft 302.

As the second end 314 of the second shaft 308 is coupled to the outer transfer gear 326, rotation of the second shaft 314 drives rotation of the outer transfer gear 326. When the second conical gear assembly 306 is in the proximal position relative to the first conical gear assembly 300, the outer transfer gear 326 engages with the sprocket gear assembly 352 disposed in a non-binding arrangement about the first shaft 302. Rotation of the sprocket gear assembly 352 in turn imparts rotation to the driver 108, which for at least one embodiment is a chainring 108'.

Moreover, whereas with a traditional bicycle the cyclists rotation of the left crank 104 and right crank 106 directly rotates a shaft to which the chainring is attached, CGBT 100 advantageously and indirectly translates the rotation of the left crank 104 and right crank 106 to drive the rotation of the first conical gear assembly 300 which is translated by a paired first gear 304 to a second gear 310 by the drive belt 328 passing therebetween to rotate the second shaft 308 which mechanically is coupled to the driver 108. The careful observer will realize that due to the internal operation of the CGBT 100 the driver 108 may rotate faster, slower or at the same rate as the rotation of the rotation of the left crank 104 and right crank 106.

Figure 4:
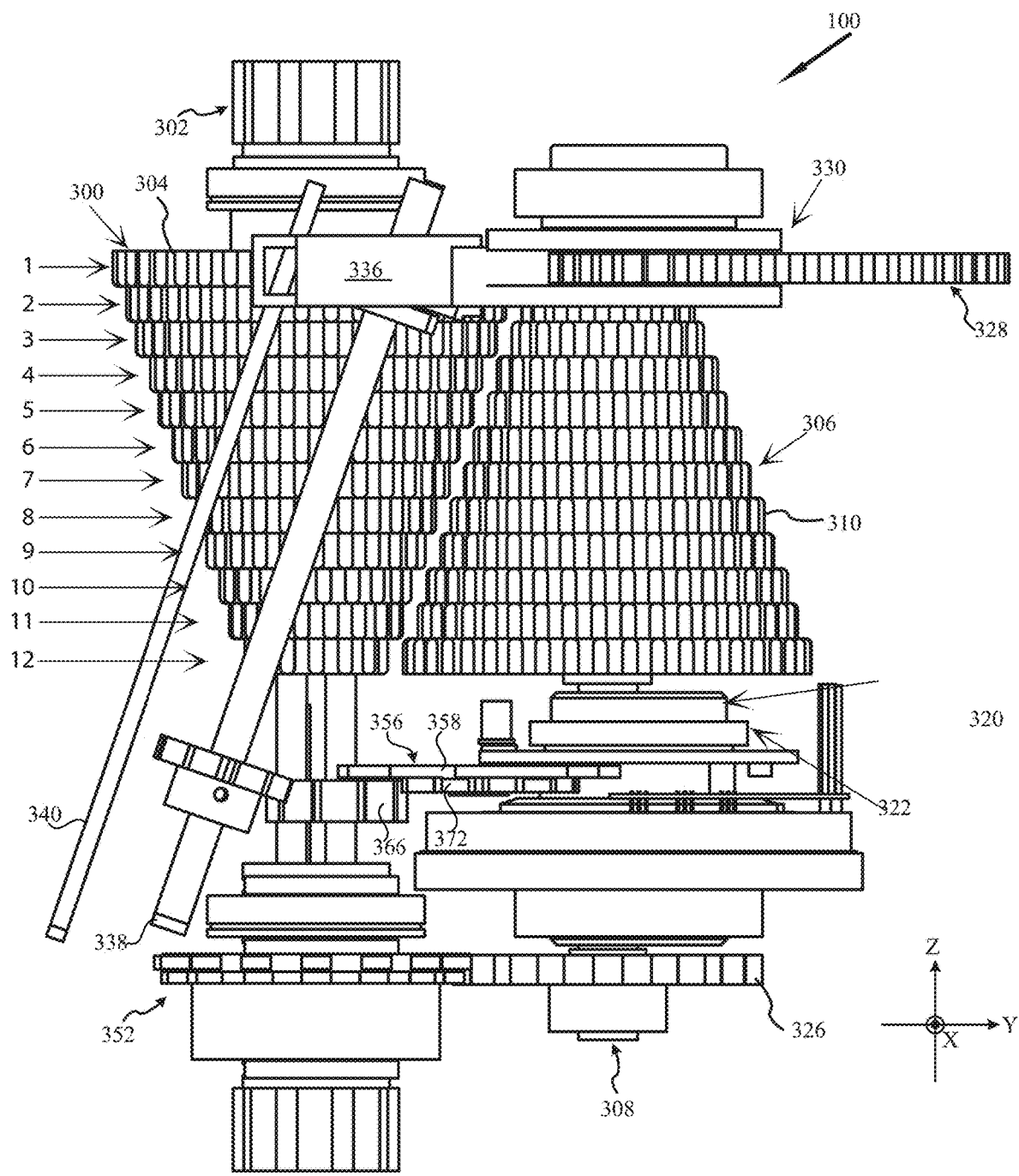
FIG. 4 is a top view of a conical gear bicycle transmission in accordance with at least one embodiment of the present invention.

FIG. 4 presents a top view of an exposed CGBT 100 assembly to further appreciate the first conical gear assembly 300 and the second conical gear assembly 306. Moreover, for at least one embodiment, each conical gear assembly 300/306 consist of a series of gears (first gears 304 and second gears 310) where the cone's smallest and largest diameters have a 3:1 ratio, such that the combined torque ratio range is 600%. As shown, for at least one embodiment, the first conical gear assembly 300 and the second conical gear assembly 306 each have twelve discreet gears. However, various gearset counts and ratio ranges may be selected for different embodiments depending on what ratios are desired and what size constraints may permit.

Moreover, for at least one embodiment the first conical gear assembly 300 and the second conical gear assembly 306 have essentially the same sized gears arranged in a progressive order, the orientation one conical gear assembly opposite from the other. In other words, first conical gear assembly 300 is essentially identical to the second conical gear assembly 306—the orientation being reversed. For yet another embodiment, the first conical gear assembly 300 and the second conical gear assembly 306 have different sized gears arraigned in a progressive order, the orientation of one conical gear assembly opposite from the other. In other words, the first conical gear assembly 300 is not identical to the second conical gear assembly 306—the orientation being reversed.

Figure 5:
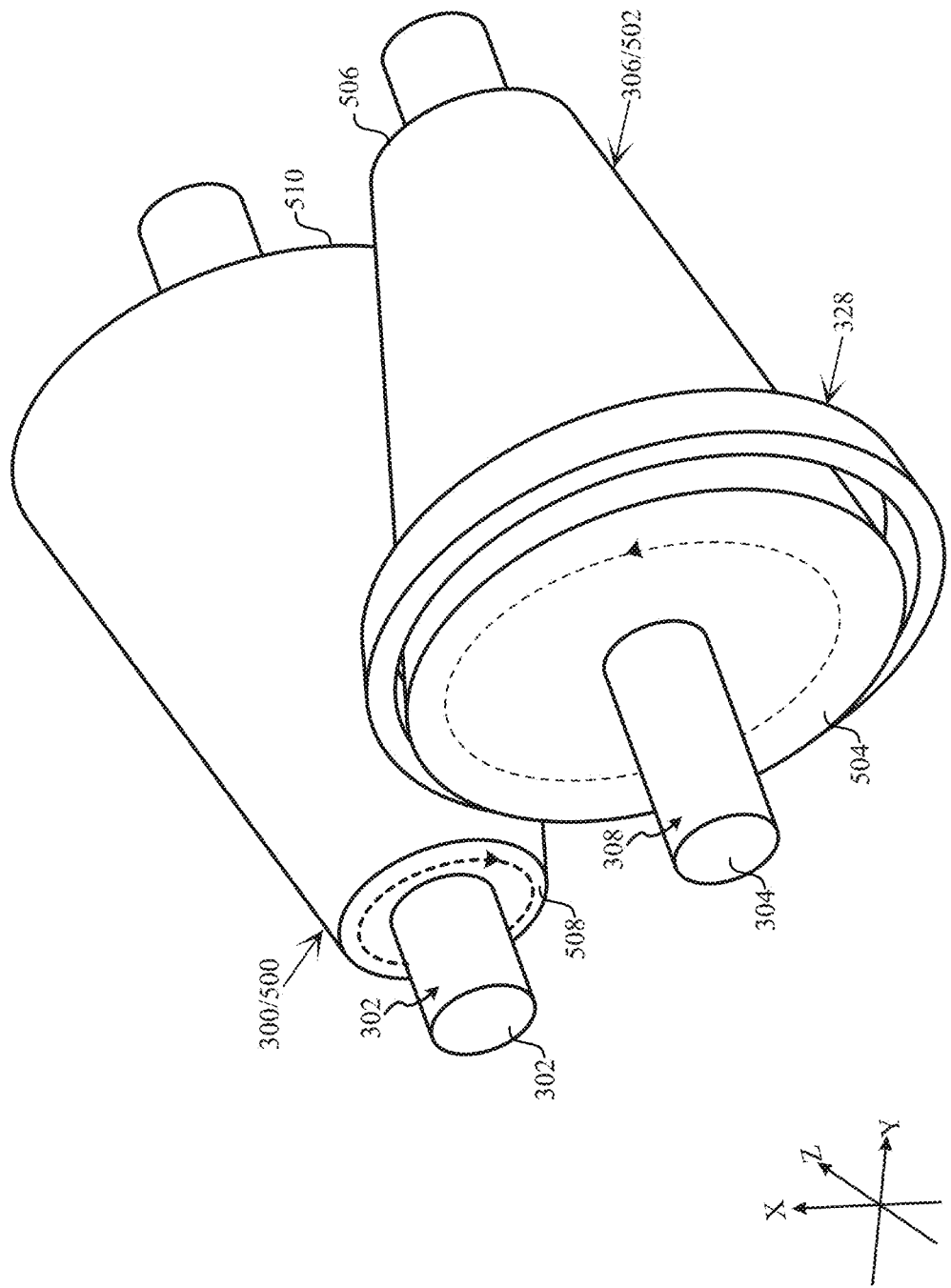
FIG. 5 is a conceptual view of the conical interaction of the conical gear bicycle transmission in accordance with at least one embodiment of the present invention.

FIG. 5 presents a simplified representation of the advantageous relationship of the first conical gear assembly 300 and the second conical gear assembly 306 and drive belt 328. The first conical gear assembly 300 is conceptually represented as first cone 500, and the second conical gear assembly 306 is represented as second cone 502. The drive belt 328 is disposed about the second cone 502 and passes between the first cone 500 and the second cone 502. As the drive belt 328 is moved from the second end 504 towards the first end 506 of the second cone 502, the drive belt 328 correspondingly moves along the first cone 500 from the first end 508 to the second end 510. Indeed, appreciating first conical gear assembly 300 as cone 500 and the second first conical gear assembly 306 as cone 502 it may be further appreciated that the two cones 500 and 502 in opposing parallel alignment provide a continuously variable transmission.

As the relative diameter of the second cone 502 is greater at the second end 504 than is the relative diameter of the first cone 500 at the first end 508, one rotation of the first cone 500 results in only a partial rotation of the second cone 502. This relationship of course changes as the location of the drive belt 328 changes—at a mid-point the rotations of the first cone 500 and the second cone 502 will be substantially the same, and when the drive belt has moved to the first end 506 of the second cone 502 and second end 510 of the first cone 500, one rotation of the first cone 500 will translate to multiple rotations of the second cone 502.

Figure 6:
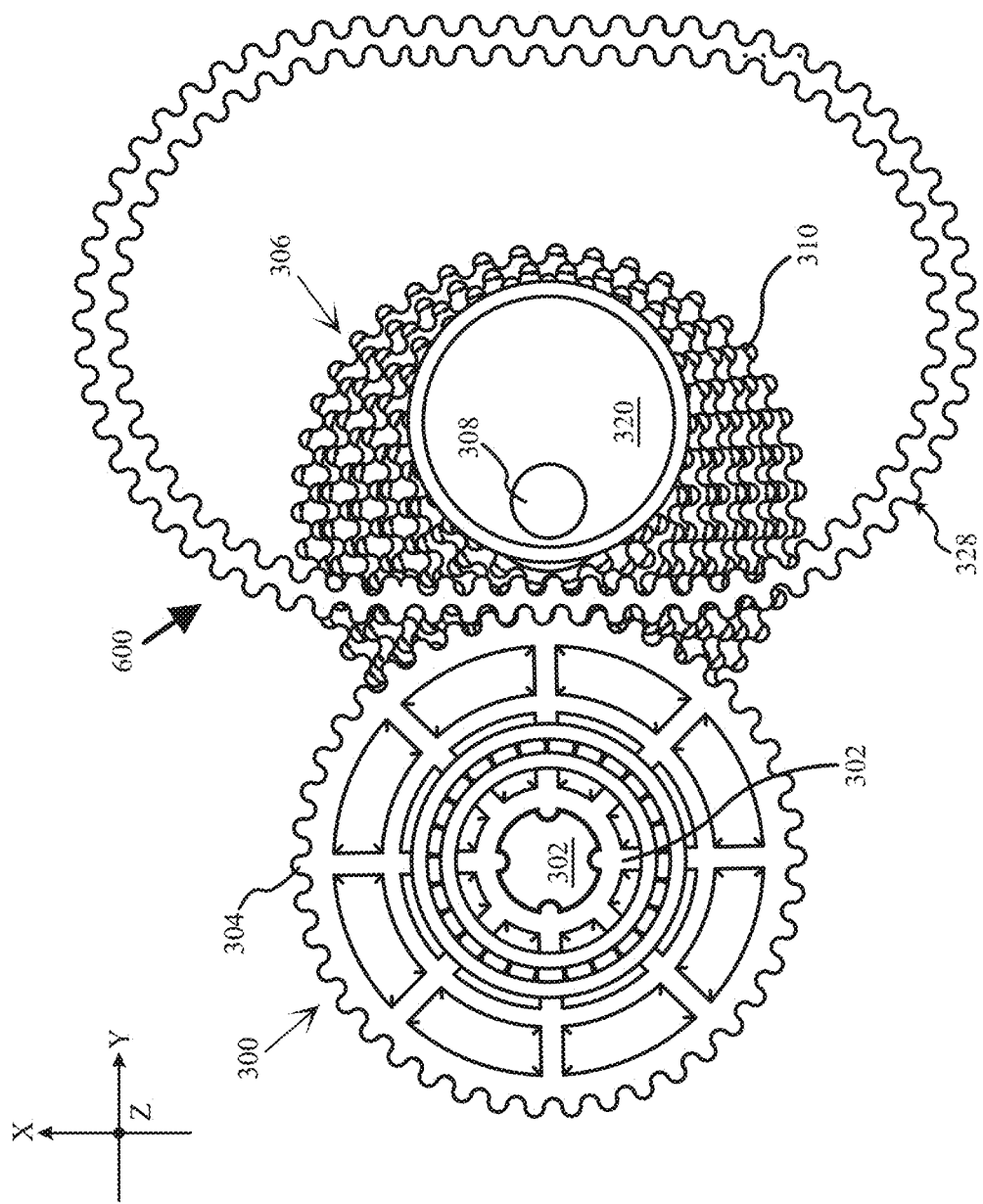
FIG. 6 is an end view of the second conical gear assembly in the proximate position relative to the first conical gear assembly in accordance with at least one embodiment of the present invention.

For CGBT 100 to advantageously permit transition between sets of gears, as noted above the second conical gear assembly 306 transitions between a proximal position and a distal position. FIGS. 6 and 7 conceptually illustrate this transition from an end view point. For ease of illustration and discussion, only one first gear 304 is shown on the first shaft 302, while the second conical gear assembly 306 has been illustrated more completely.

As shown in FIG. 6, initially the second conical gear assembly 306 is in the proximal position 600 relative to the first conical gear assembly 300, and more specifically to the first shaft 302. As such the drive belt 328 is fully engaged between the first gear 304 and a second gear 310. It will also be appreciated that FIG. 6, shows the end view of the second eccentric cam 320, and the location of the second shaft 308 supporting the second gears 310 essentially comprising the second conical gear assembly 306 is on the left side of the second eccentric cam 320.

In FIG. 7, the torque motor (not shown) has been activated and rotated one hundred eighty degrees. As the second eccentric cam 320 is indeed eccentric, the second conical gear assembly 306 is now physically disposed from the initial, proximal position 600 shown in FIG. 6 permitting engagement with a first gear 304 of the first conical gear assembly 300 through the drive belt 328, to a distal position 700 establishing disengagement between the drive belt 328 and the first gear 304. This transition from the proximal position 600 to the distal position 700 is also reinforced by appreciating that the second shaft 308 is now shown on the right side of the second eccentric cam 320.

Figure 8A:
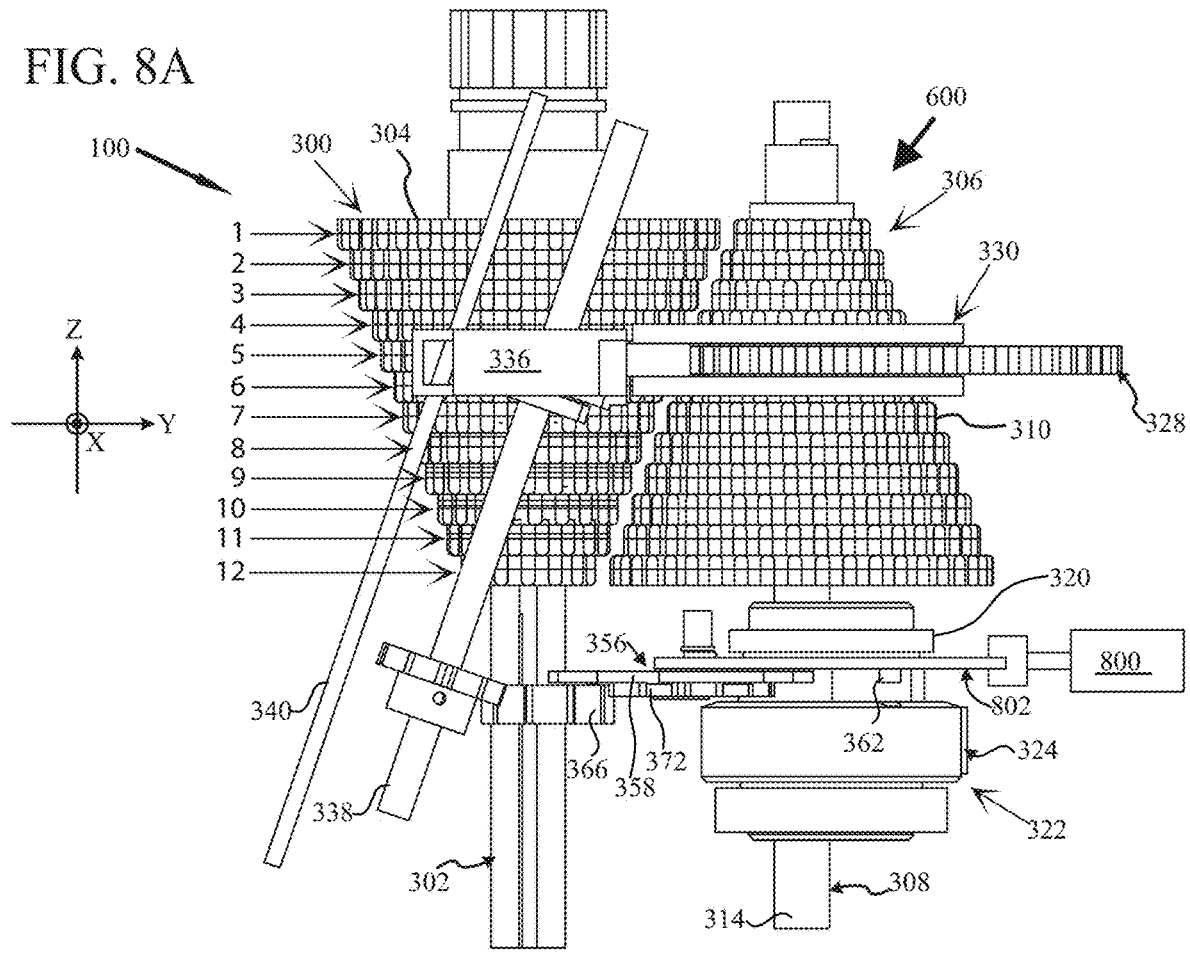
FIG. 8A is a top view and FIG. 8B is a right-side end view of the second conical gear assembly in the proximate position relative to the first conical gear assembly in accordance with at least one embodiment of the present invention.
Figure 8B:
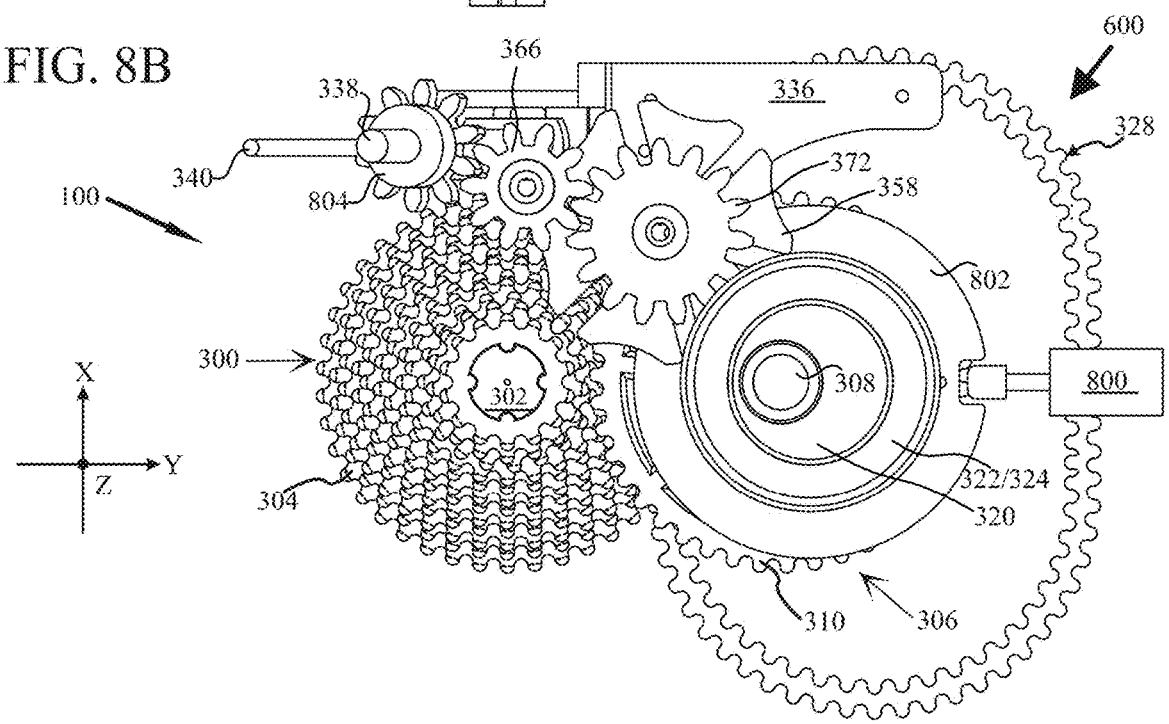
Figure 9A:
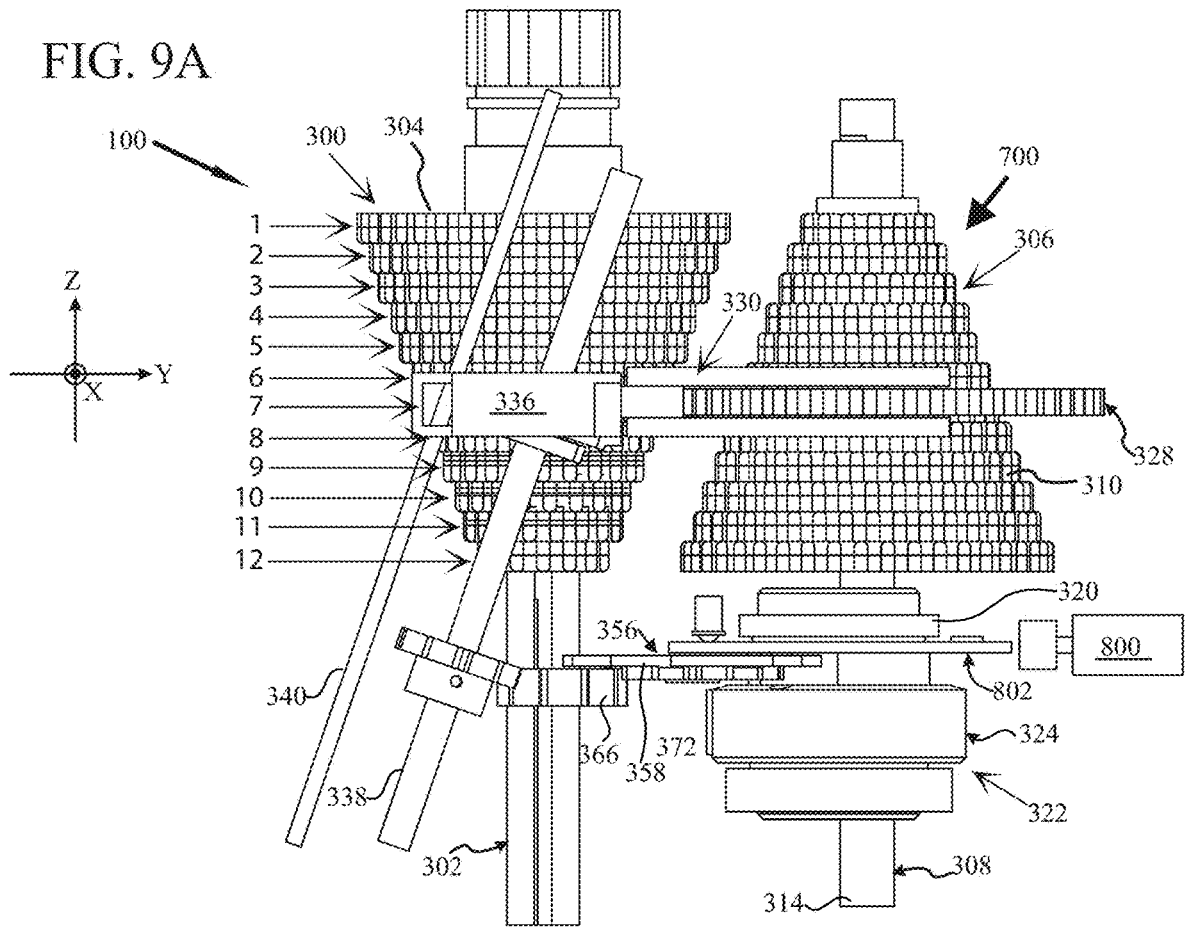
FIG. 9A is a top view and FIG. 9B is a is a right-side end view of the second conical gear assembly in the distal position relative to the first conical gear assembly in accordance with at least one embodiment of the present invention.
Figure 9B:
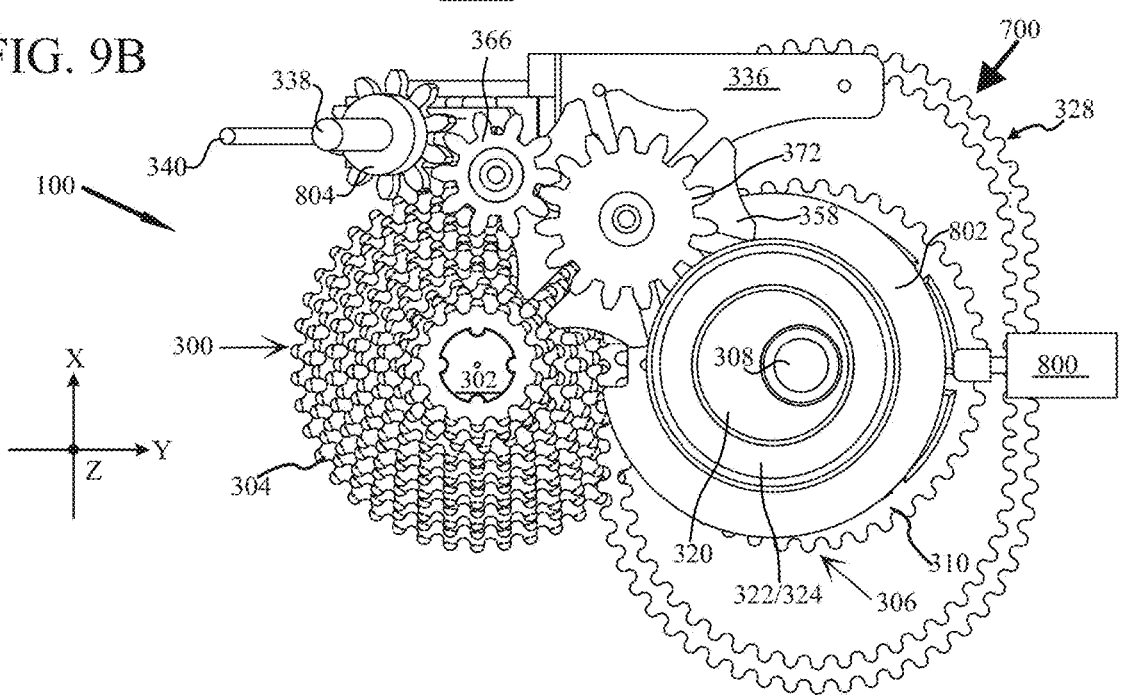

Whereas FIGS. 6 and 7 provide simplified illustrations of this transition between proximal position 600 and distal position 700, FIGS. 8A/8B and 9A/9B present further illustrations of actual elements within CGBT 100. For each set FIGS. 8A and 9A provide top views and FIGS. 8B and 9B provide end views. For each set, the top and end views have been aligned to one another so as to further appreciate the locations of the elements and their relative changes in position. In addition, the 12 gearsets provided by a first gear 304 and a second gear 310 are also shown numbered 1-12.

Turning first to FIGS. 8A and 8B, the embodiment of CGBT 100 is shown with the second conical gear assembly 306 in the proximal position 600, such that it is engaged with the first conical gear assembly 300 via the drive belt 328. As shown, CGBT 100 is presently set to the $5^{th}$ first gear 304 of the first conical gear assembly 300 and the $5^{th}$ second gear 310 of the second conical gear assembly 306. The relationship and position of the drive belt mover 330 may also be more clearly appreciated in FIG. 8A as well.

For at least one embodiment, CGBT 100 also includes a locking solenoid 800 that is structured and arranged to engage and lock the second eccentric cam 320 from potentially moving unless and until CGBT 100 commences an intended gear transmission change. Such locking may be desirable for embodiments of CGBT 100 which are intended for use in mountain bicycles where the bicycle is likely to be subjected to bumping and jarring stresses.

As may be further appreciated in FIG. 8B, the locking solenoid 800 engaged a locking pin into or against a collar 802 that is affixed to the second eccentric cam 320 and torque motor 324 assembly. The nature of the Geneva mechanism 356 may also be further appreciated. More specifically, the first Geneva gear 358 is disposed proximate to the torque motor 324 so as to be activated by at least the first pin 362 when the torque motor 324 is activate. The teeth of fist gear 366 are meshed to the coupler gear 372 joined to the first Geneva gear 358 and meshed to the intermediate gear 804 joined to the first linear actuator 338.

With respect to FIGS. 8A and 8B, the state of the second conical gear assembly 306 as being in the proximal position may also be confirmed by noting the position of the second shaft 308 in the second eccentric cam 320, the second shaft 308 shown to be on the left of the eccentric cam 320.

In FIGS. 9A and 9B, CGBT 100 is half way through a gear transition from the $5^{th}$ gear set to the $6^{th}$ gear set. The locking solenoid 800 has been disengaged and the torque motor 324 activated so as to rotate the eccentric cams (of which second eccentric cam 320 is visible) one-hundred and eighty degrees (half way). The second conical gear assembly 306 is now in the distal location, further evidenced by the second shaft 308 being shown on the right side of the second eccentric cam 320.

The rotation of the torque motor 324, second eccentric cam 320 and collar 802 has also driven the first pin 362 to engage the Geneva Mechanism 356, and more specifically the first Geneva gear 358, which in turn has imparted rotation to the first gear 366, the intermediate gear 804 and the linear actuator gear 804 which has caused the drive belt mover 330, and more specifically the first belt guider 336 to transition the drive belt 328 from $5^{th}$ gear set to the $6^{th}$ gear set.

As is shown by FIGS. 9A and 9B, the transition of the drive belt 328 occurs with the second conical gear assembly 306 in the distal position 700. Moreover, for ease and simplicity of wear on the physical elements, for at least one embodiment the use of the Geneva mechanism 356 permits CGBT 100 to precisely accomplish the transition process in discreet synchronized steps: the second conical gear assembly 306 is transitioned from the proximate location to the distal location, the drive belt mover 330 is transitioned from one gear set to the next, and the second conical gear assembly 306 is transitioned back to the proximal location.

Figure 10:
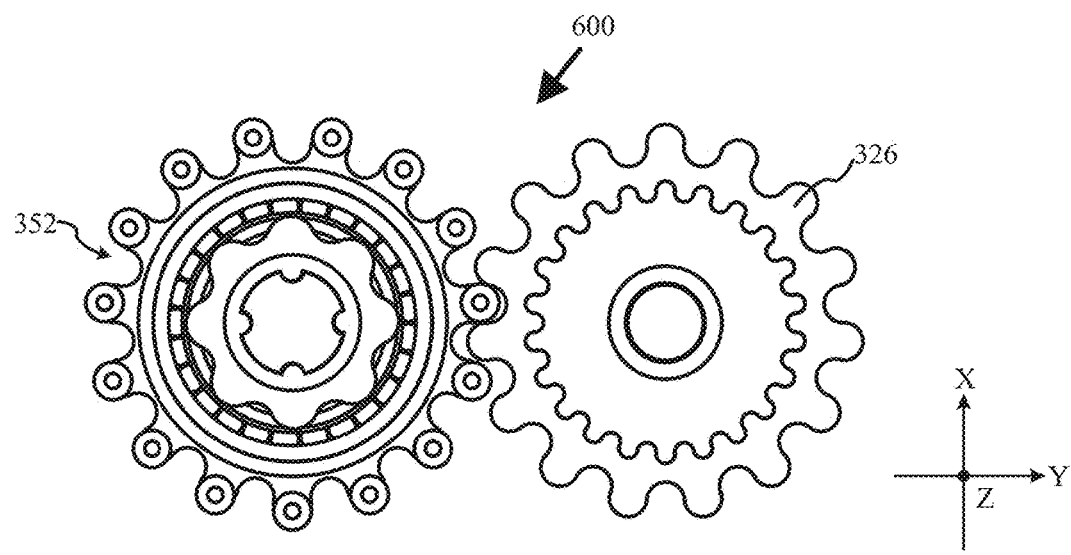
FIG. 10 is an end view of the sprocket gear assembly and the outer transfer gear engaged when the second conical gear assembly of the conical gear bicycle transmission is in the proximal position in accordance with at least one embodiment of the present invention.
Figure 11:
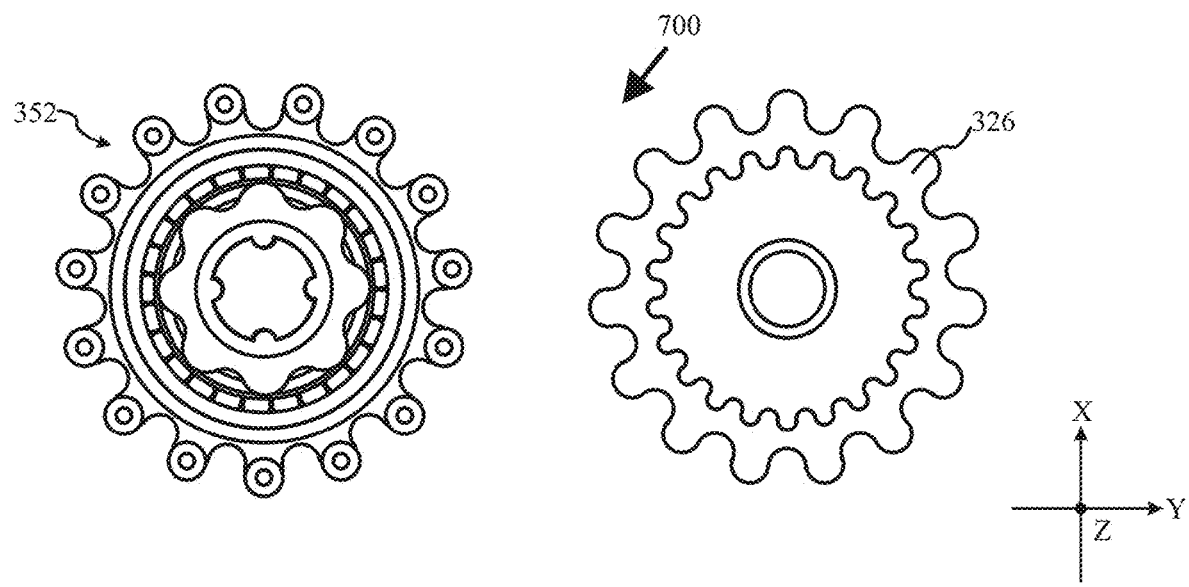
FIG. 11 is an end view of the sprocket gear assembly and the outer transfer gear disengaged when the second conical gear assembly of the conical gear bicycle transmission is in the proximal distal in accordance with at least one embodiment of the present invention.

FIGS. 10 and 11 correspond to end views of the outer transfer gear 326 and sprocket gear assembly 352. More specifically, when the second conical gear assembly 306 is in the proximate position 600 as shown in FIGS. 8A and 8B, the outer transfer gear 326 and sprocket gear assembly 352 are engaged as shown in FIG. 10. When the second conical gear assembly 306 is in the distal position 700 shown in FIGS. 9A and 9B, the outer transfer gear 326 and sprocket gear assembly 352 are disengaged as shown in FIG. 11.

It is expected that the overall weight of CGBT 100 will weigh less than the commercialized gearbox counterparts and within the range of available derailleur options. The reason for this is that traditional gearbox systems require the use of mainly high molecular weight steel working components due to the inherent toughness of steel required for meshing of spur gears under high torque. The invention's use of elastomer belts for power transmission between components eliminates this requirement, allowing for the ability to use lighter weight materials in the drive system, such as aluminum alloy, magnesium alloy, titanium and their respective alloys, as well as plastic.

For at least one embodiment, the CGBT 100 can fit within the physical constraints of the bicycle design. It can provide a Q-factor of 175 mm or smaller. The Q-factor being the lateral distance between the crank ends where the peddles attach to the cranks. This is important, as it dictates the placement of the cyclist's feet. The typical Q-factor range is between 165-185 mm. The length and height of the invention fit within the constraints dictated by the road clearance and frame design.

For another embodiment, the CGBT 100 can incorporate theft prevention features, where the bicyclist can enable a theft mode on the App. The App will subsequently notify the control unit 374 to rotate the second conical gear assembly 306 180 degrees in lieu of 360 degrees and hold in place. This separates the conical gear assemblies from the drive belt 328 and disables the bicyclist's ability to transmit torque through the transmission, thus disabling the ability to pedal the bicycle. Since the invention incorporates a control unit and battery power, the invention can incorporate a GPS unit and accelerometer, where the control unit can sense the movement of the bicycle beyond a set distance when in disable mode, and it can then send a message to the bicyclist's App that the bicycle may be experiencing unauthorized movement and can then provide continuous GPS location information to the bicyclist's App to help facilitate recovery.

Figure 13:
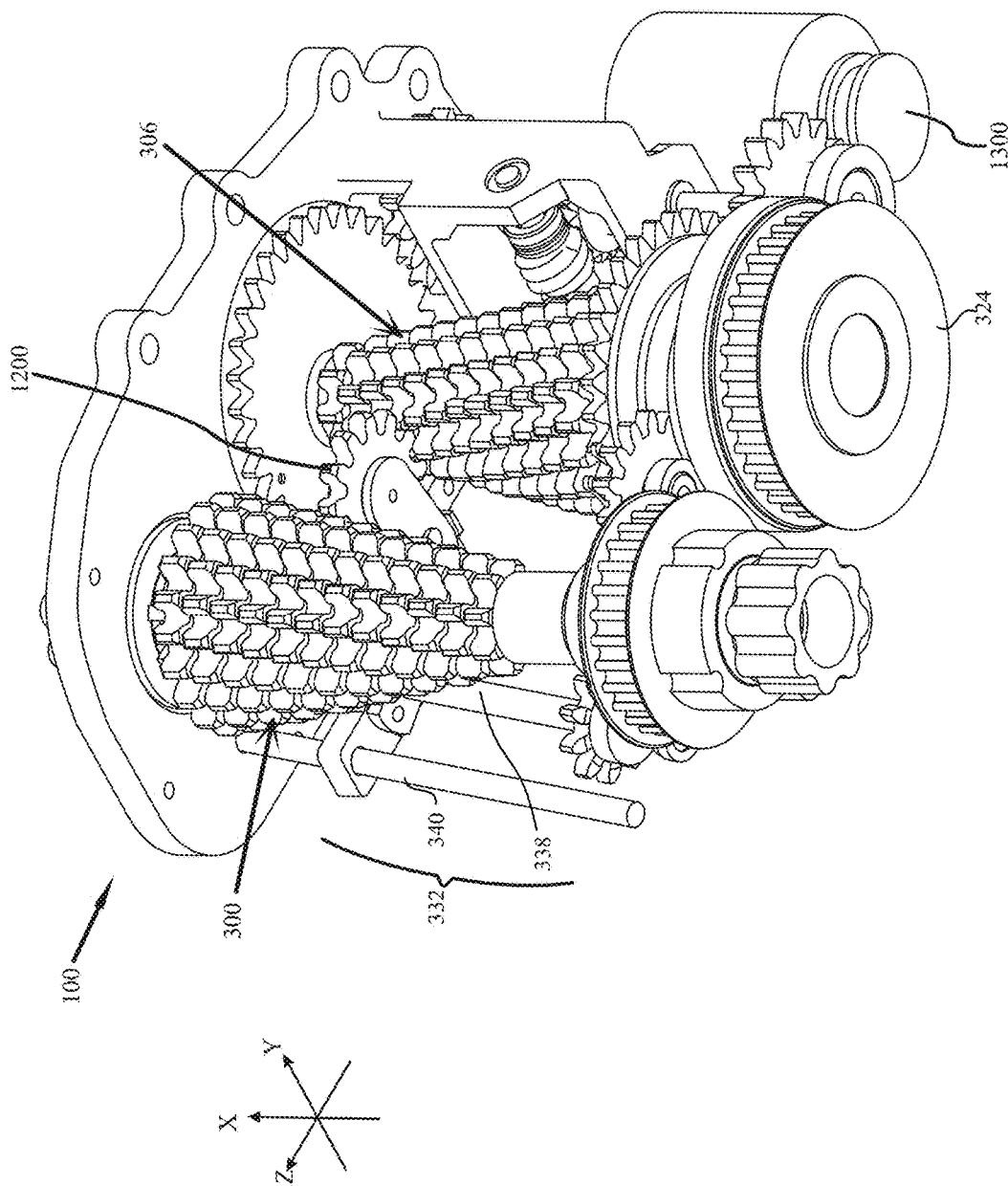
FIG. 13 is a perspective view of the conical gear assembly with the driver as a transfer wheel on a spring-loaded transfer wheel arm in accordance with at least one embodiment of the present invention.
Figure 15:
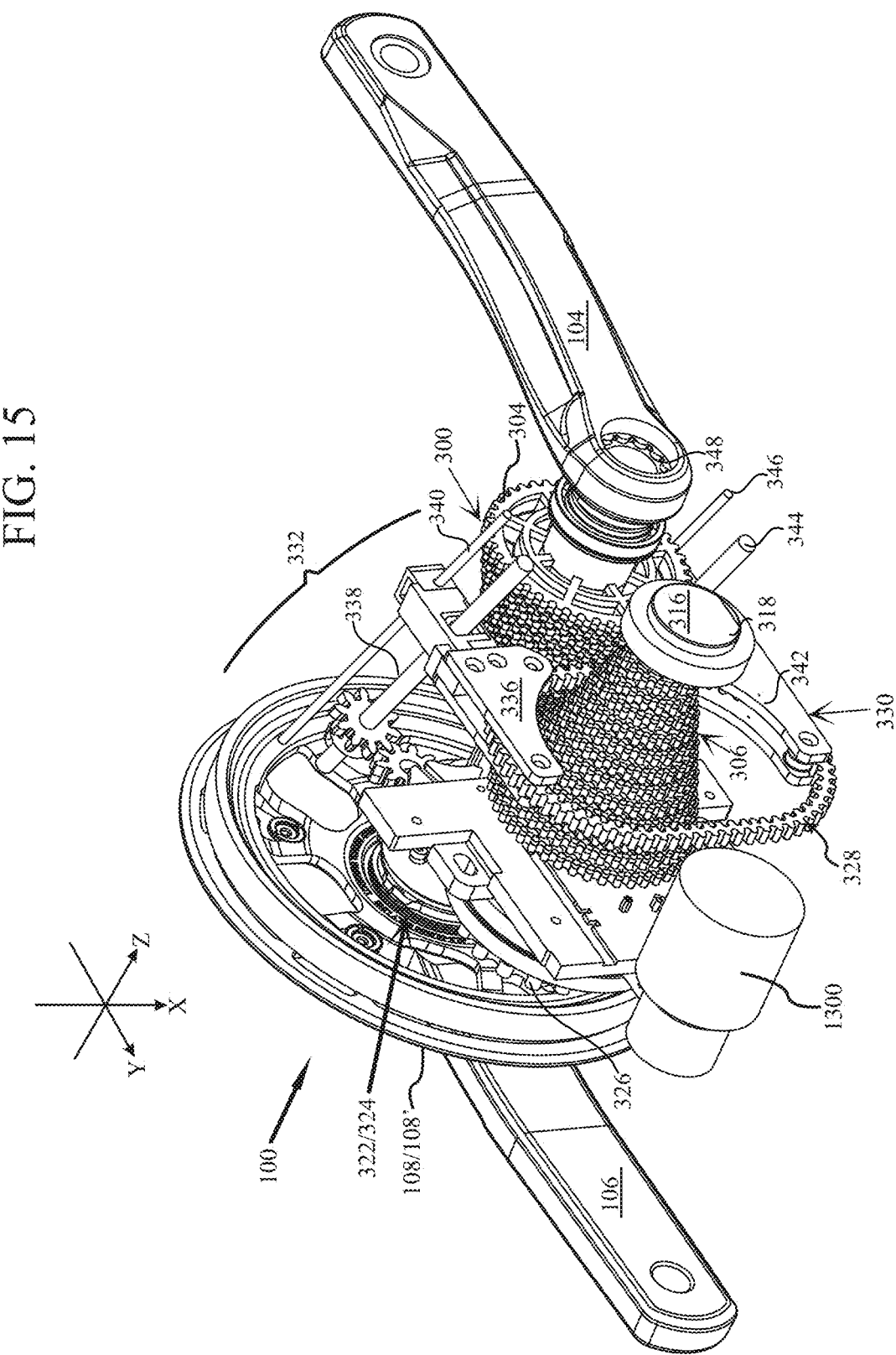
FIG. 15 is a perspective view of the conical gear assembly with a high torque motor for power augmentation in accordance with at least one embodiment of the present invention.

In another embodiment, a high torque motor, for instance around 85 Nm of torque, can be put in series in the housing 102 of CGBT 100 to the two conical gearsets and engaged with the driver 108 to provide power augmentation (i.e., an e-bike). Such optional embodiments are conceptually illustrated in FIGS. 13 and 15—FIG. 13 illustrating an embodiment of the CGBT 100 incorporating a transfer wheel 1200 as the driver between the first conical gear assembly 300 and second conical gear assembly 306, along with a torque motor 1300 for additional power augmentation, and FIG. 15 illustrating an embodiment of CGBT 100 as shown in FIG. 3A with a belt 328 as the driver between the first conical gear assembly 300 and second conical gear assembly 306, along with a torque motor 1300 for additional power augmentation.

In yet another embodiment, a compact torque motor can be located within the envelope of the driving conical gear assembly to provide a power augmentation directly to the first conical gear assembly 300, at a lower torque value than offered by a typical of a marketed e-bike. This may be an advantage for riders who may want a more sporadic, smaller amount of power assist compared to a standard e-bike (i.e. when climbing a particular challenging ascent) and don't want the additional weight of a larger motor and larger battery.

Moreover, to summarize the advantageous CGBT 100, for at least one embodiment CGBT 100 is provided by a housing 102 with a first shaft 302 passing therethrough; a first conical gear assembly 300 disposed with the housing 102 and engaged about the first shaft 302, the first conical gear assembly 300 having a plurality of first gears 304, each of a different size, arranged in a progressive order; a second conical gear assembly 306 disposed within the housing 102 and engaged about a second shaft 308 parallel to the first shaft 302, the second conical gear assembly 306 having a plurality of second gears 310, each of a different size, arranged in a second progressive order, opposite to the first progressive order, the second shaft 308 having a first end and a second end; a conical gear adjuster disposed comprising: a first eccentric 316 cam disposed in a bearing, the first eccentric 316 cam receiving the first end of the second shaft 308; a second eccentric cam 320 cam coupled to a torque motor 324, the second eccentric cam 320 cam receiving the second end of the second shaft 308, the eccentric cams permitting the second conical gear assembly 306 to have at least a distal position 700 relative to the first conical gear assembly 300 and a proximal position 600 relative to the first conical gear assembly 300 as established by the torque motor 324; a drive belt 328 disposed generally normally about one of the two conical gear assemblies and passing therebetween, the drive belt 328 engaging one of the first gears 304 to one of the second gears 310 when the second conical gear assembly 306 in in the distal position 700; at least one drive belt 328 mover structured and arranged to move the drive belt 328 along progressive order of gears when the second conical gear assembly 306 is in the distal position 700; and a driver 108 joined to an end of the second shaft 308.

For yet another embodiment, CGBT 100 may be summarized as including a housing 102 with a first shaft 302 passing therethrough; a first conical gear assembly 300 disposed within the housing 102 and engaged about the first shaft 302, the first conical gear assembly 300 having a plurality of first gears 304, each of a different size, arranged in a first progressive order; a second conical gear assembly 306 substantially equivalent to the first conical gear assembly 300, the second conical gear assembly 306 having a plurality of second gears 310 of a different size arranged in a second progressive order opposite that of the first progressive order, the second conical gear assembly 306 engaged about a second shaft 308 disposed within the housing 102 parallel to and offset from the first shaft 302, the second shaft 308 supported by a first eccentric cam 316 disposed in a circular bearing and a second eccentric cam 320 cam coupled to a torque motor 324, the eccentric cams permitting the second conical gear assembly 306 to have at least a distal position 700 relative to the first conical gear assembly 300 and a proximal position 600 relative to the first conical gear assembly 300; at least one drive belt 328 mover structured and arranged to move the drive belt 328 along progressive order of gears when the second conical gear assembly 306 is in the distal position 700; and a driver 108 joined to an end of the second shaft 308.

It will also be appreciated that a method for providing an advantageous CGBT 100 in accordance with the above description may be summarized as providing a housing 102 with a first shaft 302 passing therethrough; providing a first conical gear assembly 300 disposed within the housing 102 and engaged about the first shaft 302, the first conical gear assembly 300 having a plurality of first gears 304, each of a different size, arranged in a first progressive order; providing a second conical gear assembly 306 substantially equivalent to the first conical gear assembly 300, the second conical gear assembly 306 having a plurality of second gears 310 of a different size arranged in a second progressive order opposite that of the first progressive order, the second conical gear assembly 306 engaged about a second shaft 308 disposed within the housing 102 parallel to and offset from the first shaft 302, the second shaft 308 supported by a first eccentric 316 cam disposed in a circular bearing and a second eccentric cam 320 cam coupled to a torque motor 324, the eccentric cams permitting the second conical gear assembly 306 to have at least a distal position 700 relative to the first conical gear assembly 300 and a proximal position 600 relative to the first conical gear assembly 300; providing at least one drive belt mover 330 structured and arranged to move the drive belt 328 along progressive order of gears when the second conical gear assembly 306 is in the distal position 700; and providing a Geneva mechanism structured and arranged to transition the second conical gear assembly 306 between the proximal position 600 and the distal position 700 and engage the at least one drive belt 328 mover when the second conical gear assembly 306 is disposed away from the proximal position 600.

Changes may be made in the above methods, systems and structures without departing from the scope hereof. It should thus be noted that the matter contained in the above description and/or shown in the accompanying drawings should be interpreted as illustrative and not in a limiting sense. Indeed, many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A bicycle transmission comprising:
   a housing with a first shaft passing therethrough;
   a set of two cones in opposing parallel alignment disposed within the housing, the first cone engaged about the first shaft, the second cone engaged about a second shaft parallel to the first shaft, the second shaft structured and arranged to have at least a proximal position and a distal position relative to the first shaft;
   a driver disposed generally normally about one of the two cones and passing therebetween, the driver structured and arranged to engaging a portion of the first cone with a portion of the second cone when the second cone is in the proximal position;
   a driver mover structured and arranged to move the driver between the cones when the second cone is in the distal position; and
   a transfer element joined to an end of the second shaft.

2. The bicycle transmission of claim 1, wherein the position of the second cone is selected by a cone adjuster comprising:
   a first eccentric cam disposed in a bearing, the first eccentric cam receiving the first end of the second shaft; and
   a second eccentric cam coupled to a cam rotator, the second eccentric cam receiving the second end of the second shaft, the first eccentric cam and the second eccentric cam permitting the second cone to move between the proximal position and the distal position by activation of the cam rotator to rotate the second eccentric cam about a central axis.

3. The bicycle transmission of claim 2, further including at least one solenoid locker structured and arranged to lock the cone adjuster from operating while the second cone is in the proximal position.

4. The bicycle transmission of claim 1, wherein the cam rotator is a torque motor.

5. The bicycle transmission of claim 1, wherein the cam rotator is a manual cable driven rotator.

6. The bicycle transmission of claim 1, wherein each cone is a conical gear assembly, each having a plurality of different sized gears arranged in a progressive order.

7. The bicycle transmission of claim 1, wherein the first cone and the second cone are substantially identical.

8. The bicycle transmission of claim 1, wherein the driver is a chain.

9. The bicycle transmission of claim 1, wherein driver is a belt.

10. The bicycle transmission of claim 1, wherein driver is a transfer wheel.

11. The bicycle transmission of claim 1, wherein the transfer element is a transfer wheel.

12. The bicycle transmission of claim 1, wherein the transfer element is a belt.

13. The bicycle transmission of claim 1, wherein the transfer element is a chain.

14. The bicycle transmission of claim 1, wherein the set of cones provide a continuously variable transmission.

15. The bicycle transmission of claim 1, wherein the bicycle transmission is incorporated in an e-bike.

16. The bicycle transmission of claim 1, wherein the bicycle transmission is coupled with a high torque motor to provide additional power augmentation.

17. The bicycle transmission of claim 1, wherein the at least one drive mover comprises a cage disposed about at least a portion of the driver, the cage engaging a linear drive screw transverse to the driver, the clockwise rotation of the linear drive screw moving the cage in a first direction and the counterclockwise rotation of the linear drive screw moving the cage in a second direction opposite to the first direction.

18. The bicycle transmission of claim 17, further including a Geneva mechanism structured and arranged to synchronize the linear motion of the driver mover with the transition between distal position and proximal position of the second cone.

19. The bicycle transmission of claim 18, wherein the Geneva mechanism drives a linear drive screw engaging the cage.

20. A bicycle transmission comprising:
a housing with a first shaft passing therethrough;
a first cone disposed with the housing and engaged about the first shaft;
a second cone disposed within the housing and engaged about a second shaft parallel to the first shaft, the second cone in opposing parallel alignment to the first cone, the second shaft having a first end and a second end;
a cone adjuster comprising:
a first eccentric cam disposed in a bearing, the first eccentric cam receiving the first end of the second shaft; and
a second eccentric cam coupled to a cam rotator, the second eccentric cam receiving the second end of the second shaft, the first eccentric cam and the second eccentric cam permitting the second cone to move between the proximal position and the distal position by activation of the cam rotator to rotate the second eccentric cam about a central axis;
a driver disposed generally normally about one of the two cones and passing therebetween, the driver structured and arranged to engage a portion of the first cone with a portion of the second cone when the second cone is in the proximal position;
a driver mover structured and arranged to move the driver between the cones when the second cone is in the distal position; and
transfer element joined to an end of the second shaft.

21. The bicycle transmission of claim 20, wherein further including at least one solenoid locker structured and arranged to lock the cone adjuster from operating while the second cone is in the proximal position.

22. The bicycle transmission of claim 20, wherein the cam rotator is a torque motor.

23. The bicycle transmission of claim 20, wherein the first cone and the second cone are substantially identical.

24. The bicycle transmission of claim 20, wherein the first cone is a first gear assembly having a plurality of different sized gears arranged in a progressive order, and the second cone is a second gear assembly having different sized gears arranged in a progressive order.

25. The bicycle transmission of claim 20, wherein the bicycle transmission is incorporated in an e-bike.

26. The bicycle transmission of claim 20, wherein the bicycle transmission is coupled with a high torque motor to provide additional power augmentation.

27. The bicycle transmission of claim 20, wherein at least one driver mover comprises a cage disposed about at least a portion of the driver, the cage engaging a linear drive screw transverse to the driver, the clockwise rotation of the linear drive screw moving the cage in a first direction and the counterclockwise rotation of the linear drive screw moving the cage in a second direction opposite to the first direction.

28. The bicycle transmission of claim 27, further including a Geneva mechanism structured and arranged to synchronize the linear motion of the driver mover with the transition between distal position and proximal position of the second cone.

29. A bicycle transmission comprising:
a housing with a first shaft passing therethrough;
a first cone disposed within the housing and engaged about the first shaft;
a second cone substantially equivalent to the first cone in opposing parallel orientation, the second cone engaged about a second shaft disposed within the housing parallel to and offset from the first shaft, the second shaft supported by a first eccentric cam disposed in a circular bearing and a second eccentric cam coupled to a cam rotator, the eccentric cams permitting the second cone to have at least a distal position relative to the first cone and a proximal position relative to the first cone;
a driver disposed generally normally about one of the two cones and passing therebetween, the driver structured and arranged to engaging a portion of the first cone with a portion of the second cone when the second cone is in the proximal position;
a driver mover structured and arranged to move the driver between the cones when the second cone is in the distal position; and
a transfer element joined to an end of the second shaft.

30. The bicycle transmission of claim 29, wherein further including at least one solenoid locker structured and arranged to lock the conical gear adjuster from operating while the second cone is in the proximal position.

31. The bicycle transmission of claim 29, wherein the cam rotator is a torque motor.

32. The bicycle transmission of claim 29, wherein the first cone is a first gear assembly having a plurality of different sized gears arranged in a progressive order, and the second cone is a second gear assembly having different sized gears arranged in a progressive order.

33. The bicycle transmission of claim 29, wherein the bicycle transmission is incorporated in an e-bike.

34. The bicycle transmission of claim 29, wherein the bicycle transmission is coupled with a high torque motor to provide additional power augmentation.

35. The bicycle transmission of claim 29, wherein the at least one driver mover comprises a cage disposed about at least a portion of the driver, the cage engaging a linear drive screw transverse to the driver, the clockwise rotation of the linear drive screw moving the cage in a first direction and the counterclockwise rotation of the linear drive screw moving the cage in a second direction opposite to the first direction.

36. The bicycle transmission of claim 34, further including a Geneva mechanism structured and arranged to synchronize the linear motion of the driver mover with the transition between distal position and proximal position of the second cone.

* * * * *